(12) United States Patent
Ainsworth et al.

(10) Patent No.: US 11,776,308 B2
(45) Date of Patent: Oct. 3, 2023

(54) FRICTIONLESS ACCESS CONTROL SYSTEM EMBODYING SATELLITE CAMERAS FOR FACIAL RECOGNITION

(71) Applicant: Johnson Controls Tyco IP Holdings LLP, Milwaukee, WI (US)

(72) Inventors: Peter Alexander Ainsworth, Oxfordshire (GB); Ian C. Westmacott, Tewksbury, MA (US); Martin J. Donaghy, Antrim (GB); John McKenna, Maghera (GB); Derek Boyes, Armagh (GB); Terry Neill, Antrim (GB); Frederick Michael McBride, Antrim (GB); Walter A. Martin, Ballymena (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 27 days.

(21) Appl. No.: 16/753,571

(22) PCT Filed: Oct. 24, 2018

(86) PCT No.: PCT/US2018/057305
§ 371 (c)(1),
(2) Date: Apr. 3, 2020

(87) PCT Pub. No.: WO2019/084133
PCT Pub. Date: May 2, 2019

(65) Prior Publication Data
US 2020/0293756 A1    Sep. 17, 2020

Related U.S. Application Data

(60) Provisional application No. 62/577,023, filed on Oct. 25, 2017.

(51) Int. Cl.
*G06V 40/16* (2022.01)
*G07C 9/00* (2020.01)
(Continued)

(52) U.S. Cl.
CPC ............ *G06V 40/161* (2022.01); *G06F 18/22* (2023.01); *G06V 10/993* (2022.01);
(Continued)

(58) Field of Classification Search
CPC ............ G06K 9/00288; G06K 9/6215; G06K 9/00281; G06K 9/00926; G07C 9/00182; G07C 9/00563
See application file for complete search history.

(56) References Cited

U.S. PATENT DOCUMENTS 9,292,733 B2 *  3/2016  Sato ..................... G06V 40/171
9,779,316 B2    10/2017 Rao et al.
(Continued)

FOREIGN PATENT DOCUMENTS

| CN | 106845460 A | 6/2017 |
|---|---|---|
| EP | 2 993 619 A1 | 9/2016 |
| WO | WO 2016187573 | 11/2016 |

OTHER PUBLICATIONS

International Search Report and Written Opinion of the International Searching Authority, dated Jan. 24, 2019, from International Application No. PCT/US2018/057305, filed on Oct. 24, 2018. 14 pages.

(Continued)

*Primary Examiner* — Ruiping Li
(74) *Attorney, Agent, or Firm* — ArentFox Schiff LLP

(57) ABSTRACT

A frictionless access control system and method embodying satellite cameras for facial recognition are disclosed. The cameras capture image data of individuals at an access point such as a door. Preferably, two or more cameras are placed (Continued)

on opposite sides of the access point to increase the likelihood that the individuals are captured in the image data. A facial cropper module extracts facial patches from the image data, and a facial signature module computes facial signatures from the facial patches. A facial recognition module receives the computed facial signatures from the facial signature module, matches the computed facial signatures to stored facial signatures, and sends user identity information of individuals corresponding to the stored facial signatures to the facial signature module when the computed facial signatures match the stored facial signatures.

21 Claims, 17 Drawing Sheets

(51) Int. Cl.
*G06F 18/22* (2023.01)
*G06V 10/98* (2022.01)
*G06V 40/50* (2022.01)

(52) U.S. Cl.
CPC .......... *G06V 40/171* (2022.01); *G06V 40/172* (2022.01); *G07C 9/00182* (2013.01); *G07C 9/00563* (2013.01); *G06V 40/50* (2022.01)

(56) References Cited

U.S. PATENT DOCUMENTS

| | | |
|---|---|---|
| 2010/0111377 A1 | 5/2010 | Monroe |
| 2012/0293642 A1* | 11/2012 | Berini ................ G06K 9/00154 348/77 |
| 2016/0253883 A1 | 9/2016 | Westmacott et al. |
| 2016/0335495 A1 | 11/2016 | Kim et al. |

OTHER PUBLICATIONS

International Preliminary Report on Patentability, dated May 7, 2020, from International Application No. PCT/US2018/057305, filed on Oct. 24, 2018. 8 pages.

* cited by examiner

| authorized user table 96 | | | |
|---|---|---|---|
| user identity information 109 | authorization level 110 | Employee# 111 | Supervisor Name 112 |
| John Doe | deny | 233 | J. Smith |
| S. Jones | allow | 250 | J. Smith |
| J. Smith | allow | 251 | V. Chokra |
| ⋮ | ⋮ | ⋮ | ⋮ |
| H. Cortez | allow | 299 | V. Chokra |

FIG. 7

FRICTIONLESS ACCESS CONTROL SYSTEM EMBODYING SATELLITE CAMERAS FOR FACIAL RECOGNITION

RELATED APPLICATIONS

This application is a § 371 National Phase Application of International Application No. PCT/US2018/057305, filed on Oct. 24, 2018, now International Publication No. WO 2019/084133 A1, published on May 2, 2019, which International Application claims the benefit under 35 USC 119(e) of U.S. Provisional Application No. 62/577,023, filed on Oct. 25, 2017, both of which are incorporated herein by reference in their entirety.

BACKGROUND OF THE INVENTION

Access control systems are often used at public and private premises, such as households, commercial buildings, businesses, retail establishments, schools, hospitals and government buildings, to list a few examples. Access control system nodes are then installed at access points of the premises (e.g. front and interior doors of a building) to control access to restricted areas, such as the building itself or to areas within the buildings. The access control systems authenticate identities of (or authorize) individuals and then permit those authenticated individuals to access the restricted areas through the access point.

Historically, the main components of the access control systems were access card readers and possibly door controllers. The access card readers were often installed at the access points and enabled presentation of credentials to obtain access to the restricted areas. Typically, individuals would interact with the access card readers by presenting access cards such as keycards or contactless smart cards to the readers. The access card readers would read the credential information of the keycards and compare the information against a database of authorized individuals to determine if the individuals were authorized to access the restricted areas. If the individuals were authorized, then the access card readers might signal the door controller to unlock doors or not generate alarms, for example.

SUMMARY OF THE INVENTION

These traditional access control systems have limitations. In one example, the individuals must specifically present the access cards to the card reader at each access point to ingress/egress restricted areas. Individuals typically must place their access cards such that the access cards either make direct physical contact with the access readers or are within a few inches of the access readers. This formal interaction process can be an inconvenience to users of such systems. The access cards can also be stolen, which enables otherwise unauthorized individuals to obtain access.

On the other hand, operators of modern access control systems have increasingly incorporated additional security components into the access control systems. These additional components often include surveillance cameras that capture image data, video management systems (VMS) that store the image data, and possibly video analysis systems that analyze the image data.

These modern access control systems can even employ image analysis and facial recognition techniques upon the image data to authorize the users. This facial recognition based authorization is in place of or in addition to the key card based authorization. For this purpose, the cameras typically send the image data over the networks (local and/or remote) to the other components of the system for analysis.

In general, according to one aspect, the invention features an access control system. The access control system includes one or more surveillance cameras at an access point that capture image data, a facial cropper module, a facial signature module, and a facial recognition module. The facial cropper module extracts facial patches from the image data, and the facial signature module computes facial signatures from the facial patches. The facial recognition module receives the computed facial signatures from the facial signature module, matches the computed facial signatures to stored facial signatures, and sends user identity information of individuals corresponding to the stored facial signatures to the facial signature module when the computed facial signatures match the stored facial signatures.

The facial signature module can rank the facial patches using image quality factors to determine acceptable facial patches for individuals, and can compute the facial signatures from the acceptable facial patches. Preferably, the facial signature module determines a highest ranked acceptable facial patch for each of the individuals, and computes a single facial signature for each of the individuals from the highest ranked acceptable facial patch for each of the individuals.

Typically, the facial signature module compares each of the facial patches against one another to determine whether the facial patches are associated with same individuals or different individuals.

In some embodiments, the surveillance cameras include the facial cropper module and the facial signature module.

The access control system might include a local control unit at the access point that includes the facial cropper module and the facial signature module, in other cases.

In some cases, the local control unit includes a cache of the stored facial signatures, and the facial recognition module matches the computed facial signatures to the cache of the stored facial signatures. The facial recognition module also executes upon a microcontroller of the local control unit.

The access control system can include a connected services system that is remote to the access control point and that includes a server, wherein the server includes the facial recognition module. In these embodiments, the facial recognition module executes upon a microcontroller of the server.

In one example, the facial recognition module determines whether the individuals are authorized based on the user identity information.

In one implementation, the facial signature module sends a signal to unlock the door system when the facial recognition module determines that the individuals are authorized based upon the user identity information.

In one embodiment, the surveillance cameras include the facial cropper module and the facial signature module and send the computed facial signatures to a connected services system that includes the facial recognition module.

In general, according to another aspect, the invention features a method for controlling an access control system. This method includes one or more surveillance cameras at an access point capturing image data, extracting facial patches from the image data, computing facial signatures from the facial patches, matching the computed facial signatures to stored facial signatures, and using user identity information of individuals corresponding to the stored facial signatures when the computed facial signatures match the stored facial signatures.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 7 is a block diagram that shows more detail for an authorized user table in the connected services system;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
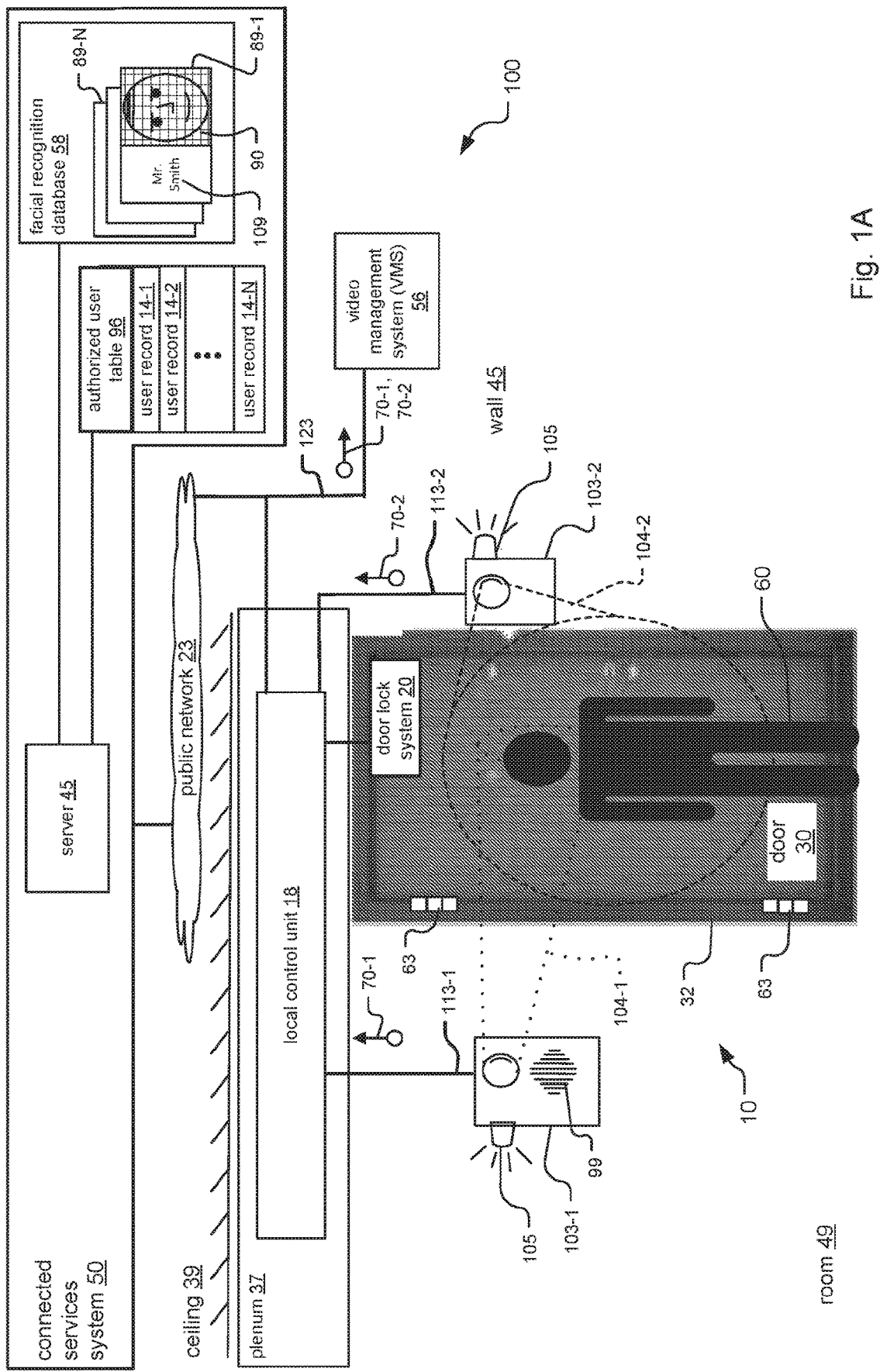
FIG. 1A is a schematic, high-level diagram of a distributed access control system to which the invention is applicable, where components of the access control system including cameras, a local control unit, and a connected services system are also shown.

FIG. 1A shows a distributed access control system 100 to which the invention is applicable.

The access control system 100 monitors areas near an access point 10. The term "access point" refers to a place through which an individual 60 enters or leaves a building or other structure. Examples of access points 10 include doors within or around buildings, elevators, and guard stations at a multi-building facility.

In the specific illustrated case, the access point includes a door 30 and a door frame of the door 32, with a door lock system 20 located between the door 30 and the door frame 32. The access point 10 is installed in a room 49 of a building. Hinges 63 rotatably connect the door to the door frame. An individual 60 is standing near the door 30.

The access control system has various components. These components include surveillance cameras 103, a local control unit 18, a video management system (VMS) 56, and a connected services system 50. In the illustrated example, two cameras 103-1 and 103-2 are mounted to a wall 45 and are located on opposite sides of the door 30. The placement of the cameras 103 on opposite sides of the door 30 provides both entry and exit access control.

Preferably, multiple cameras 103 are placed to capture images of the individuals 60 at the access point 10. In the illustrated example, two cameras 103-1 and 103-2 are placed on opposite sides of the access point 10 to improve the chance that facial images of the individuals 60 are captured by at least one of the cameras 103. The cameras 103-1 and 103-2 have fields of view 104-1 and 104-2 that are pointed to capture at least faces of the individuals 60 in image data 70-1 and 70-2. The cameras also have lenses which enable the cameras 103 to capture the facial images of the individuals when the individuals 60 are up to 3 meters away from the access point 10. This allows time for the access control system to perform facial recognition of the individual before the person physically reaches the access point 10. In one implementation, as many as four cameras 103 are placed at the access point 10.

The cameras 103 might have additional features. In one example, the cameras 103 capture the image data 70 in uncompressed, raw video format. The cameras 103 include an indicator 105 and possibly an intercom 99. The cameras 103 are typically 1 to 2 mega pixel cameras. If required, higher mega pixel cameras can be used at lower frame rates.

The local control unit 18 is a computer system that receives and distributes the image data 70 from the cameras 103 and also controls the door lock system 20. The local control unit 18 receives image data 70-1 and 70-2 from cameras 103-1 and 103-2 via cables 113-1 and 113-2. The local control unit can then distribute the image data 70 to other components over local or remote networks. The local control unit 18 sends door unlock signals to the door lock system 20.

The cables 113 are of different types and enable the exchange of different information between the cameras 103 and the local control unit 18. The cables 113 are typically coaxial cables or shielded twisted pair cables, in examples. Power, image data 70 and control signals are passed through these cables 113.

The local control unit 18 is preferably securely located in proximity to the access point 10. In the illustrated example, the local control unit 18 is included within a plenum 37 above the access point. The plenum 37 is located between a ceiling 39 of the room 49 and a top of the door frame 32.

The local control unit 18 sends the image data over a local network 123. The local network 123 might be a local area network or wide area network that supports standard and/or proprietary communications protocols. Example communications protocols include TCP/IP and Ethernet. The local network might be a wired network, or a wireless network using WiMax or WiFi, in examples The VMS 56 is located on the local network 123. The VMS 56 receives the image data 70 sent from the local control unit 18 and stores the image data 70. In one example, the cameras 103 stream the image data over the local network 123 to the VMS 56. Display devices on the network 123 such as monitors can provide multiple live views of the image data 70 via suitable network client connections.

The connected services system 50 includes a server 45, an authorized user table 96 and a facial recognition database 58. The connected services system 50 is typically cloud based and the server 45 is a low latency cloud server.

The connected services system 50 is a remote system that communicates over a leased data connection or private/public network 23 with the local control unit 18. The connected services system 50 is sometimes administered by separate business entities than the owners and/or occupants of the buildings, which contain the local control unit 18. In one example, the connected services system 50 can be administered by a third party and/or an entity providing services to the local control unit. In one example, the network 23 is the internet.

A facial signature is a file computed for each individual 60 that represents the face of the individual. Each facial signature includes a unique value or unique dataset of values that represent the face of the individual 60. To compute the facial signature for each individual 60, a predetermined facial recognition algorithm or transform scans one or more facial images of the individual 60, and computes the facial signature from the facial images.

The facial signatures support different file formats. The formats can be binary or text based. In one specific example, the facial signatures are stored in Common Biometric Exchange File Format (CBEFF). The CBEFF is a standard format for biometric information of individuals such as facial information, and describes a set of data elements necessary to support biometric technologies in a common way. In another specific example, the facial signatures are stored in ISO/IEC 19794-5 format. ISO/IEC 19794-5 is an international format that defines a standard scheme for codifying data describing human faces, within a CBEFF-compliant data structure. In other specific examples, the facial signatures might be stored using any of the following United States American National Standards Institute (ANSI)/National Institute of Standards and Technology (NIST) formats: ANSI/NIST-ITL 1-2007, 1-2011, and 1-2013, ANSI/NIST-ITL 2-2008, and National Information Exchange Model (NIEM). Use of these formats promotes standardized biometric data interchange and interoperability of biometric-based application programs such as the facial recognition algorithms, in examples. Additionally, proprietary formats for storing the facial signatures might be used.

The facial recognition database 58 includes entries 89-1 . . . 89-N typically for each individual (e.g. employee, worker) registered with the access control system. In some cases, the database 58 further includes entries for other individuals such as non-employees, visitors and otherwise. Individuals registered with the access control system may or may not be authorized users, however.

The entries 89 include stored facial signatures 90 and user identity information 109 for each user, if known. In more detail, the user identity information 109 might include a user name, employee number, visitor badge number, or credential that is unique to each user. In this way, the user identity information 109 in each entry 89 can be used to identify the individual corresponding to the stored facial signature 90.

The authorized user table 96 includes user records 14 for each authorized user. The user records 14 include information for authorizing the users in the facial recognition database 58. In examples, the user records 14 include information such as the user identity information 109 and an authorization level (e.g. allow or deny access).

In general, the individuals 60 are originally registered as users and then authorized when the individuals are hired as employees of a business or other entity at which the access control system 100 is installed. A guard or security operator at the connected services system 50 creates at least one entry 89 in the database 58 for each individual/user. Then, the security operator creates an associated user record 14 for each user/individual in the authorized user table 96.

The stored facial signatures 90 are preferably computed using predetermined facial recognition algorithms or transforms. The predetermined algorithms scan facial images of the individuals 60 and convert the facial images to the facial signatures 90 in response. The algorithms also preferably create the facial signatures 90 in a predetermined or pre-agreed upon file format (e.g. CBEFF or NIEM).

The access control system 100 generally operates as follows. The cameras 103 send the image data 70 over the cables 113 to the local control unit 18. The local control unit forwards the image data 70 over the local network 123 for storage at the VMS 56. The cameras 103 or the local control unit 18 then perform image analysis on the image data. The image analysis determines facial information of individuals 60 at the access point 10. Then, either the local control unit or the connected services system 50 perform facial recognition operations upon the facial information.

The facial recognition operations determine whether the individuals 60 are identified and authorized users of the access control system. The facial recognition operations first match the facial information determined by the cameras 103 or the local control unit 18 against the facial recognition database 58 to obtain an associated identity for the individuals. The identity information of the individuals are then compared to the authorized user table 96 to determine whether the identified individuals are authorized users of the access control system 100.

Figure 1B:
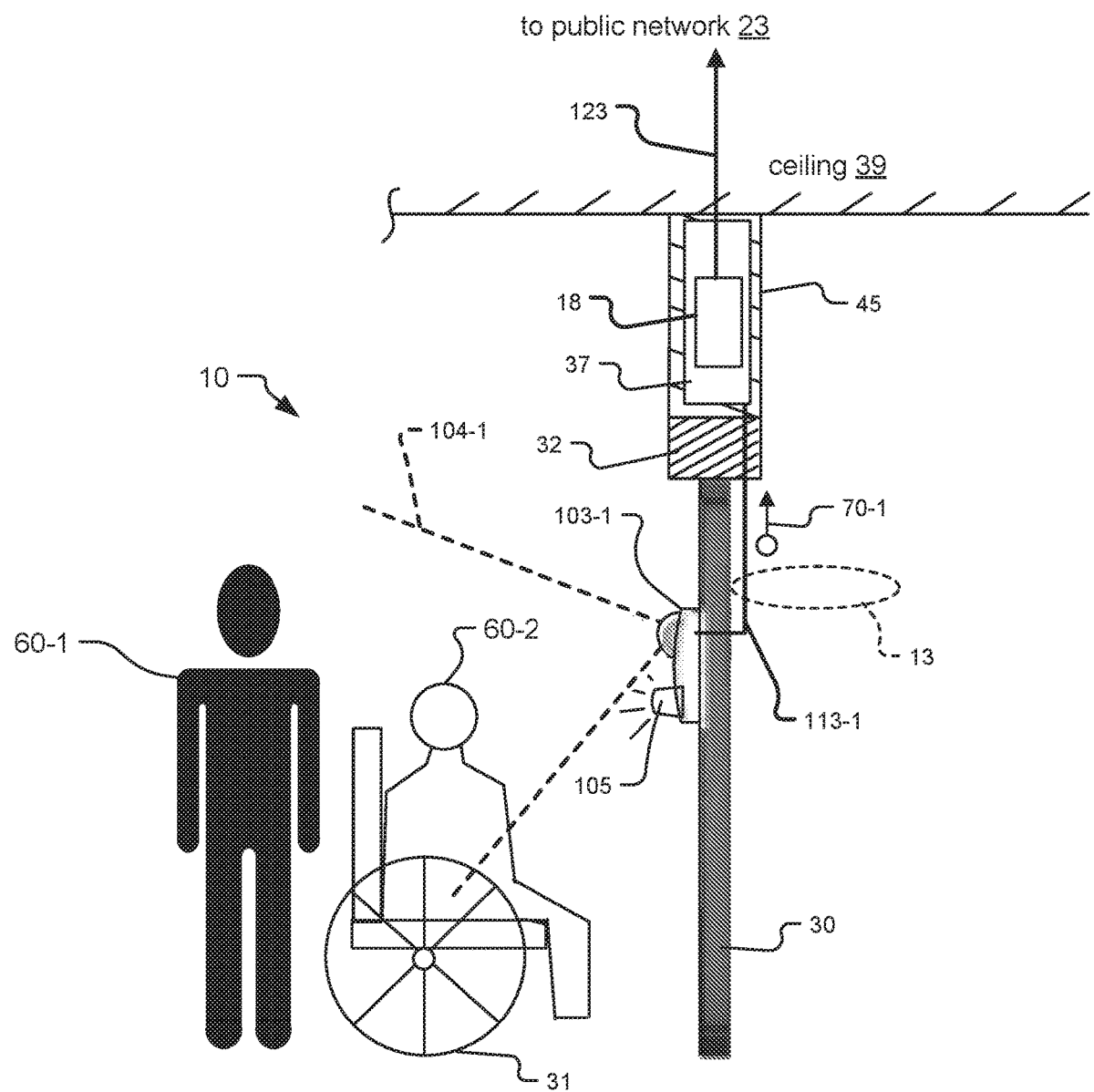
FIG. 1B is a schematic diagram showing a side view of an access point of the access control system in FIG. 1A.

FIG. 1B shows a side view of the access control system 100 in FIG. 1A. Only camera 103-1 is shown.

By way of a specific example, two individuals 60-1 and 60-2 are at the door 30. Individual 60-1 is standing, and individual 60-2 is in a wheelchair 31. The field of view 104-1 of the camera 103-1 is pointed to enable the camera 103-1 to capture facial views of both individuals 60-1 and 60-2.

Figure 2:
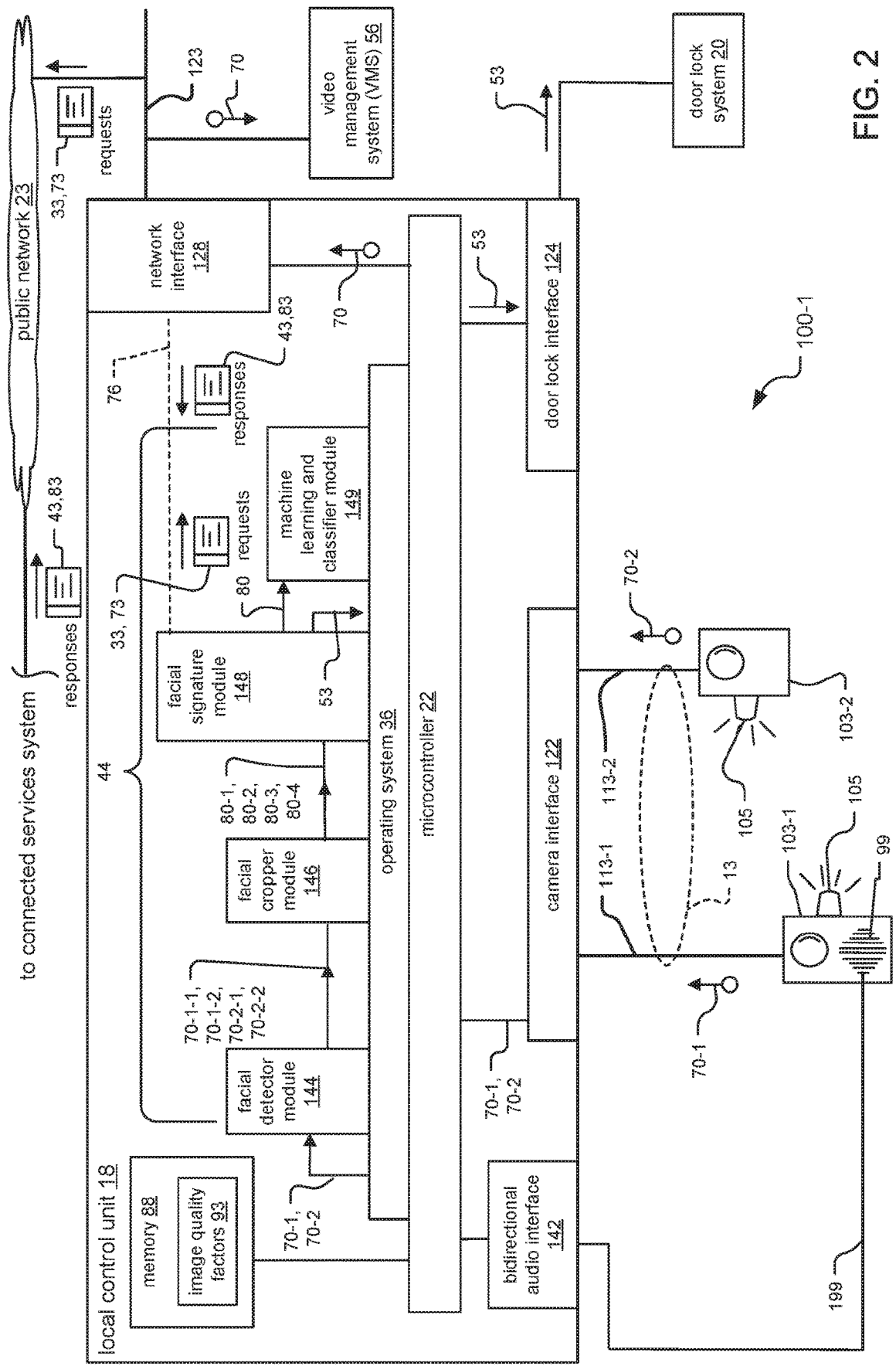
FIG. 2 is a schematic diagram for a first embodiment of the access control system in FIG. 1A.

FIG. 2 illustrates the first embodiment of the access control system 100-1.

This embodiment distributes image analysis and facial recognition between the local control unit 18 and the connected services system 50. The cameras 103 typically send the image data 70 directly to the local control unit 18 for analysis. For this reason, relatively inexpensive cameras 103 can be used.

In the illustrated example, the local control unit 18 includes various components. These components include various interfaces, modules 44, a microcontroller 22, an operating system 36, and a memory 88.

The interfaces include a bidirectional audio interface 142, a camera interface 122, a door lock interface 124, and a network interface 128.

A number of modules 44 are shown. These modules 44 include a facial detector module 144, a facial cropper module 146, a facial signature module 148, and a machine learning and classifier module 149. The modules might be software or firmware modules.

The modules 44, the operating system 36, and the microcontroller 22 are shown in a stack-like arrangement. The modules 44 are on top of the operating system 36, and the operating system 36 is on top of the microcontroller 22. This arrangement is due to the fact that the operating system 36 operates as an intermediary between the modules 44 and the microcontroller 22.

The operating system 36 facilitates operation of the modules 44 and schedules their execution on the microcontroller 22. Specifically, the operating system 36 passes information between the microcontroller 22 and the modules 44, loads instructions of the modules 44 into the memory 88, and schedules the modules 44 for execution upon the microcontroller 22.

The microcontroller 22 communicates with each of the interfaces to enable the local control unit 18 to communicate and exchange information with other components of the access control system 100-1. Via the cable 113 for each camera 103, the camera interface 122 receives the image data 70 from the cameras 103, sends control signals to the cameras 103, and controls remote power 13 for powering the cameras 103. The remote power 13 might be based upon alternating current (AC), direct current (DC), power over cable (PoC), or power over Ethernet (PoE/PoE++), in examples.

The door lock interface 124 enables the microcontroller 22 to control the door lock system 20. For this purpose, the microcontroller 22 sends door unlock signals 53 via the door lock interface 124 to the door lock system 20. The network interface 128 enables communication between the local control unit 18 and the components that connect to local network 123 and the public network 23. The bidirectional audio interface 142 sends and receives speech signals 199 to/from the intercom 99 of camera 103-1.

In the illustrated example, some of the communications associated with the modules 44 are shown. The modules are shown communicating with other modules 44, the network interface 128, and the microcontroller 22 via the operating system 36. A virtual communications channel 76 is shown between the facial signature module 148 and the network interface 128. This channel 76 abstracts a communications path that includes the facial signature module 148, the operating system 36, the microcontroller 22, and the network interface 128.

The facial signature module 148 and the network interface 128 exchange messages over the virtual communications channel 76. These messages include facial recognition request messages 33 and facial recognition response messages 43, and user authorization request messages 73 and user authorization response messages 83. The facial signature module 148 sends the request messages 33,73 via the network interface 128 and public network 23 to the connected services system 50. In response, the connected services system 50 sends the response messages 43,83. Each facial recognition request message 33 has a corresponding response message 43, and each user authorization request message 73 has a corresponding response message 83.

The memory 88 also includes image quality factors 93. During operation of the access control system 100-1, one or more modules 44 access and use the image quality factors 93.

The access control system 100-1 generally operates as follows. The camera interface 122 receives the image data 70 from the cameras 103, and forwards the image data 70 to the microcontroller 22. The microcontroller 22 and the operating system 36 provide the image data 70 to the modules 44. The modules 44 detect faces of the individuals 60 in the image data 70 and compute facial signatures from the detected faces.

The modules 44 first prepare and send the facial recognition request messages 33 to the connected services system 50. Specifically, the facial signature module 148 includes the computed facial signatures in the request messages 33, and sends the request messages 33 via the network interface 128 to the connected services system 50.

The connected services system 50 receives the request messages 33, determines whether the information in the request messages 33 (i.e. the computed facial signatures)

closely match any stored facial signatures 90, and sends facial recognition response messages 43 back to the local control unit 18.

At the local control unit 18, the facial signature module 148 creates and sends the user authorization request messages 73 if the content of the facial recognition response messages 43 identifies an individual. Specifically, if the facial recognition response messages 43 include non-NULL user identity information 109 for users, the facial signature module 148 creates the user authorization request messages 73, includes the user identity information 109 in the request messages 73, and sends the request messages 73 to the connected services system 50. If the response messages 43 have NULL references for the user identity information 109, no request messages 73 are created.

The connected services system 50 receives the request messages 73, and sends user authorization response messages 83 back to the local control unit 18 in response. The response messages 83 indicate whether the individuals represented by the user identity information 109 in the request messages 73 are authorized users.

At the local control unit 18, the facial signature module 148 enables access to the door 30 when the user authorization response messages 83 indicate that the individual 60 is an authorized user and authorized to pass through the door. The local control unit 18 enables access to the door 30 by sending a door unlock signal 53 via the door lock interface 124 to the door lock system 20. In another implementation, the connected services system 50, via its server 45, might send the door lock signal 53 to the local control unit 18.

Figure 3:
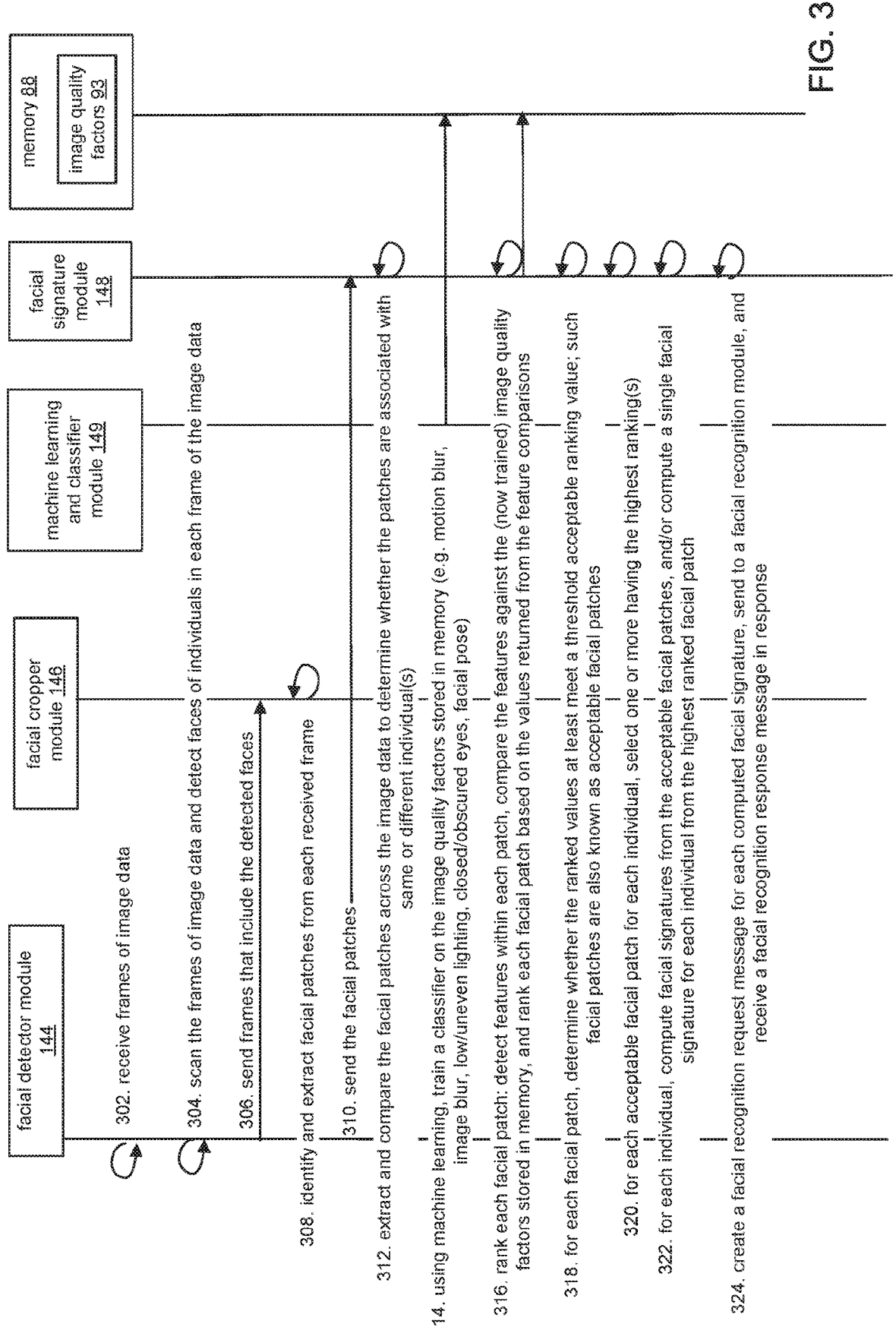
FIG. 3 is a sequence diagram that shows operation of and interactions between various modules in the access control system, where the modules perform image analysis of image data captured by the cameras.

FIG. 3 shows detailed operation of and interactions between various modules 44 in the access control system. In one example, the modules 44 are located in the local control unit 18 within the first embodiment of the access control system 100-1 in FIG. 2. These modules 44 include the facial detector module 144, the facial cropper module 146, the machine learning and classifier module 149, and the facial signature module 148.

Operation of these modules 44 is generally as follows.

In step 302, the facial detector module 144 receives frames of image data 70. In one example, when the facial detector module 144 is located in the local control unit 18 within the first embodiment of the access control system 100-1 in FIG. 2, the facial detector module 144 receives the image data 70 from the microcontroller 22 of the local control unit 18.

In step 304, the facial detector module 144 scans the frames of image data 70 and detects faces of individuals 60 in each frame of the image data 70. Frames that do not include faces of the individuals 60 are dropped. The facial detector module 144 then sends the frames that include the detected faces to the facial cropper module 146 in step 306. Because the facial detector module 144 drops frames that do not include faces of the individuals 60, this limits the amount of information exchanged between the modules 144/146 and improves processing time.

According to step 308, the facial cropper module 146 identifies and extracts facial patches of the individuals 60 from each received frame. The facial cropper module 146 sends the facial patches to the facial signature module 148 for more analysis.

In step 312, the facial signature module 148 extracts and compares the facial patches across the image data to determine whether the facial patches are associated with same or different individual(s). This operation is performed for the following reason.

An individual 60 standing at the access point 10 will be captured on multiple, if not many, frames of image data 70 from possibly multiple cameras 103. For the purpose of facial recognition, typically only one or several facial patches of an individual 60 are required. Thus, the facial signature module 148 associates detected face patches in one frame with detected face patches in subsequent frames. In this way, though each individual 60 might correspond to a collection of facial patches extracted from multiple frame images, the facial signature module 148 will select only one or several facial patches for each individual 60. Thus, the facial signature module 148 compares each of the facial patches against one another to determine whether the facial patches are associated with same individuals or different individuals 60.

The facial signature module 148 compares the facial patches against the image quality factors 93 to determine whether the facial patches are suitable for subsequent facial recognition. To improve the likelihood that the facial patches are suitable for subsequent facial recognition, the machine learning and classifier module 149 in step 314 trains a classifier on the image quality factors 93. The machine learning and classifier module 149 uses machine learning for this purpose. In response to the training, the machine learning and classifier module 149 stores any updates to the image quality factors 93 to the memory 88.

More detail for the image quality factors 93 is as follows. The image quality factors include image blur, motion blur, lighting level, eye detection, and facial pose factors. The image blur factor measures the extent to which the face of an individual 60 in an image, such as the facial patch, is in or out of focus. The motion blur factor measures the extent to which the individual is stationary or moving. The eye detection factor measures the extent to which the individual's eyes are open and discernible. The lighting level factor measures the extent to which light is directly shone upon an individual's face, and accounts for shadows and background lighting. The facial pose factor measures the extent to which the face is directly facing a lens of the camera 103, or tilted or angled relative to the lens.

The machine learning and classifier module 149 also trains the classifier on the image quality factors 93 for the following reasons. In one example, a direct correlation between the combination of the image quality factors 93 and facial recognition success is not known. In another example, the facial recognition might be performed at a remote location having possibly different or unknown facial recognition algorithms. These algorithms may be affected differently by the image quality factors 93.

In step 316, the facial signature module 148 ranks each facial patch. In one implementation, the facial signature module 148 ranks the facial patches by detecting features within each facial patch, and comparing the features against the (now trained) image quality factors 93 in the memory 88. The features might include eyes, nose, nostrils, eyebrows, ears, lips, and mouth of the individual 60, scars or other distinguishing features, and possibly facial expressions, in examples. To obtain the overall rank for each facial patch, the facial signature module 148 then might add the values returned from the feature comparisons, in one example.

In step 318, for each facial patch, the facial signature module 148 determines whether the ranked value for each of the facial patches at least meets a threshold acceptable rank value. Facial patches having a ranked value below this threshold are dropped from the analysis, and facial patches having a ranked value that meet the threshold are designated as acceptable facial patches.

In step 320, for each acceptable facial patch for each individual 60, the facial signature module 148 selects one or more acceptable facial patches having the highest ranking(s).

In step 322, for each individual 60, the facial signature module 148 computes facial signatures from the acceptable facial patches. When only one highest ranked facial patch was selected in step 320, the facial signature module 148 computes a single facial signature for that individual 60 from the one highest ranked facial patch.

The access control system generally computes the facial signatures of individuals 60 arriving at the access point 10 as follows. The facial signature module 148 computes the facial signatures from the facial patches. For this purpose, the facial signature module 148 preferably uses the same predetermined facial recognition algorithms or transforms that were employed at the connected services system 50 when registering the individuals in the facial recognition database 58. The facial signature module 148 also computes the facial signatures using the predetermined or pre-agreed upon file format that was employed when creating the facial signatures 90 for the users in the facial recognition database 58.

In one implementation, the facial signature module 148 ranks the facial patches using the image quality factors 93 to determine acceptable facial patches for individuals, and computes the facial signatures from the acceptable facial patches. Moreover, the facial signature module 148 might also determine a highest ranked acceptable facial patch for each of the individuals 60, and compute a single facial signature for each of the individuals from the highest ranked acceptable facial patch for each of the individuals 60.

According to step 324, the facial signature module 148 creates a facial recognition request message 33 for each computed facial signature. The facial signature module 148 sends the request message 33 to a facial recognition module, and the facial recognition module sends a facial recognition response message 43 in response.

Figure 4A:
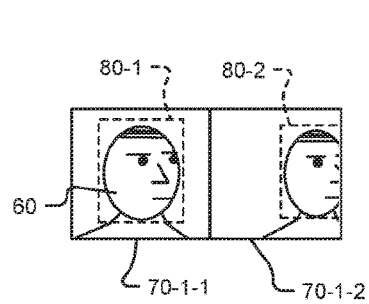
FIGS. 4A and 4B are diagrams that show exemplary frames of the image data from two cameras, where the frames of image data include facial images of an individual at the access point, and where the image data is used to illustrate operation of the access control system.
Figure 4B:
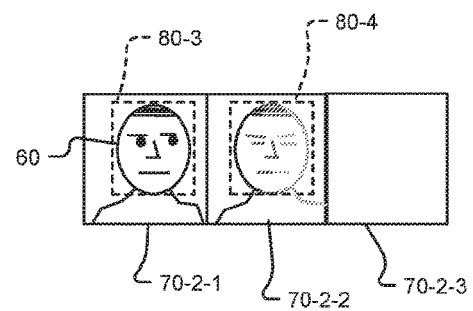

FIGS. 4A and 4B are diagrams that show exemplary frames of the image data 70-1 and 70-2 from each of the cameras 103-1 and 103-2, respectfully. The image data 70 are used to illustrate operation of various modules 44 in the first embodiment of the access control system 100-1 in FIG. 2. The image data 70-1 and 70-2 includes facial images of the same individual 60 at the access point 10.

In FIG. 4A, the image data 70-1 includes frames 70-1-1 and 70-1-2. The frames 70-1-1 and 70-1-2 include different side views of the same individual 60. In FIG. 4B, the image data 70-1 include frames 70-2-1, 70-2-2, and 70-2-3. The frames 70-2-1 and 70-2-2 include different front views of the individual 60, and frame 70-2-3 is empty.

During operation of the access control system 100-1, the various modules 44 analyze the image data 70 as follows. The facial detector module 144 detects facial images of the individual 60 in frames 70-1-1 and 70-1-2 in the image data 70-1 of FIG. 4A, and detects facial images of the individual 60 in frames 70-2-1 and 70-2-2 in the image data 70-2 of FIG. 4B. The facial detector module 144 sends the frames 70-1-1, 70-1-2, 70-2-1, and 70-2-2 in which facial images have been detected to the facial cropper module 146.

The facial cropper module 146 identifies and extracts facial patch 80-1 from frame 70-1-1, facial patch 80-2 from frame 70-1-2, facial patch 80-3 from frame 70-2-1, and facial patch 80-4 from frame 70-2-2.

More detail for facial patches 80-1 through 80-4 is as follows. Facial patch 80-1 is a complete side view of the individual's face and includes both eyes, nose and mouth. Facial patch 80-2 is a partial or "cut off" side view of the individual's face. One of the eyes is missing, and only portions of the nose and mouth exist. Facial patch 80-3 is a distinct front view of the individual's face and includes both eyes, nose and mouth. Facial patch 80-4 is a blurred or unevenly lit front view of the individual's face. The eyes of the individual 60 are not discernible, due to the individual likely blinking when the image was captured.

The facial detector module 144 then sends the facial patches 80-1, 80-2, 80-3, and 80-4 to the facial signature module 148 for further analysis.

The facial signature module 148 then ranks the facial patches 80 against the image quality factors 93 to determine acceptable facial patches for the individuals 60. Here, the facial signature module 148 would likely determine that only facial patch 80-1 and 80-3 are acceptable facial patches.

The facial signature module 148 would likely determine that only facial patch 80-1 and 80-3 are acceptable facial patches for the following reasons. Facial patches 80-1 and 80-3 include the entire face of the individual, include facial features such as both eyes, the nose and the mouth. The facial patches 80-1 and 80-3 are also in focus without motion blur, and were captured under better than average lighting conditions. In contrast, facial patch 80-2 does not include the entire face of the individual, and the face is missing an important facial feature such as one of the eyes. Facial patch 80-4 is also out of focus, and the eyes of the individual in the facial patch 80-4 are closed. As a result, facial patches 80-1 and 80-3 would likely be acceptable, and patches 80-2 and 80-4 would be unacceptable.

If the facial signature module 148 were to select only one highest ranked acceptable facial patch for the individual 60, the facial signature module 148 would likely select facial patch 80-3. This is because the facial signature module 148 ranks facial patches having front views of an individual's face, such as facial patch 80-3, higher than side views such as facial patch 80-1.

Figure 5:
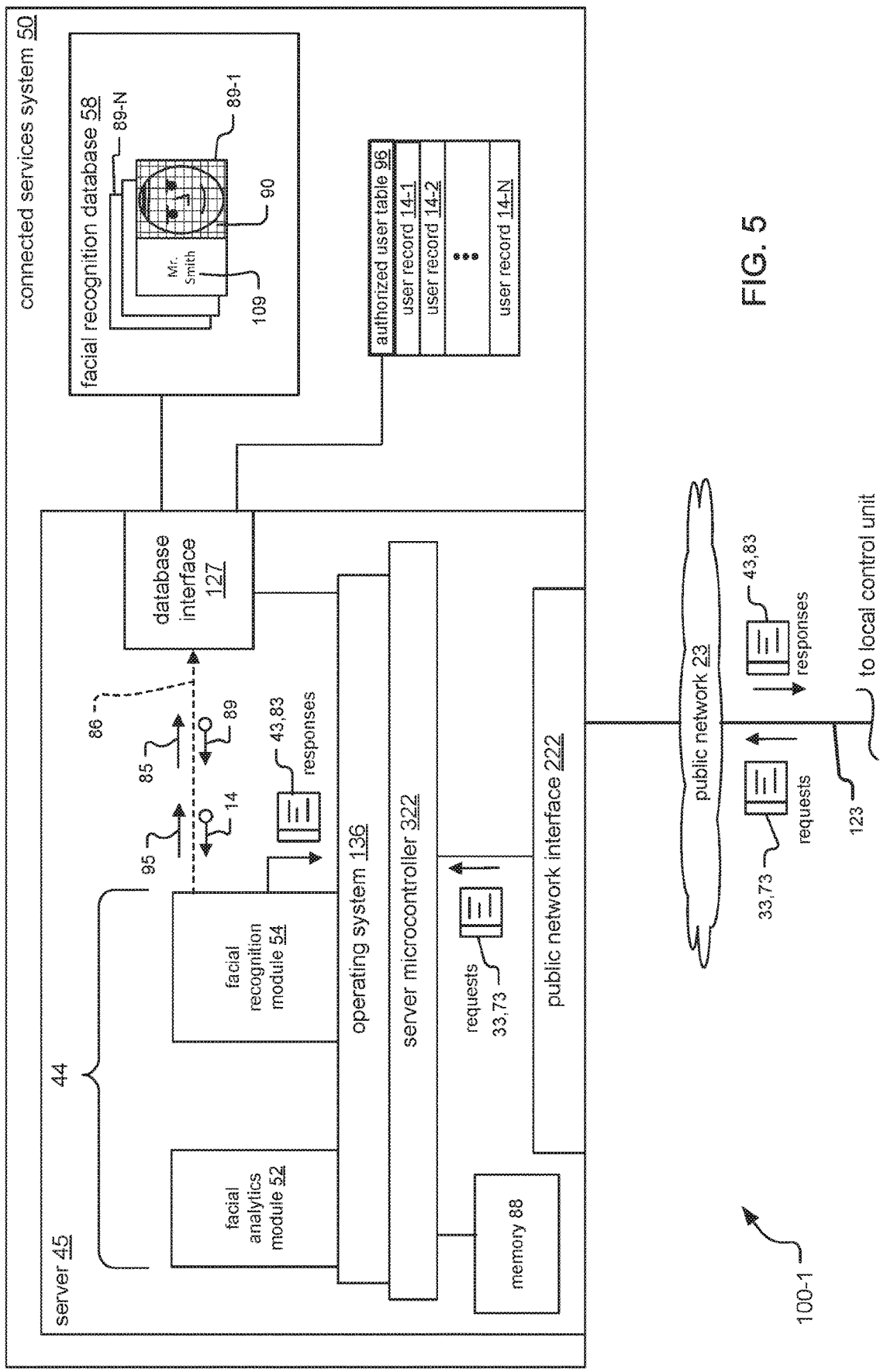
FIG. 5 is a schematic diagram that shows more detail for the connected services system in the first embodiment of the access control system shown in FIG. 2.

FIG. 5 shows more detail for the connected services system 50 in the first embodiment of the access control system 100-1 in FIG. 2.

The server 45 of the connected services system 50 includes various components. These components include interfaces, the memory 88, a server microcontroller 322, an operating system 136, and various modules 44.

The interfaces include a public network interface 222 and a database interface 127. The public network interface 222 enables the connected services system to communicate over the public network 23, and the database interface 127 enables the server to communicate with the facial recognition database 58 and the authorized user table 96.

The modules 44 include a facial analytics module 52 and a facial recognition module 54. The modules might be software or firmware modules.

The modules 44, the operating system 136, and the server microcontroller 322 are shown in a stack-like arrangement. The modules 44 are on top of the operating system 136, and the operating system 136 is on top of the server microcontroller 322. This arrangement is due to the fact that the operating system 136 operates as an intermediary between the modules 44 and the server microcontroller 322.

The operating system 136 facilitates operation of the modules 44 and schedules their execution on the microcontroller 322. Specifically, the operating system 136 passes information between the microcontroller 322 and the modules 44, loads instructions of the modules 44 into the memory 88, and schedules the modules 44 for execution upon the server microcontroller 322.

The server microcontroller 22 communicates with each of the interfaces to enable the connected services system 50 to communicate and exchange information with other components. The public network interface 222 forwards the facial recognition request messages 33 and the user authorization request messages 73 received over the public network 23 to the server microcontroller 322. The server microcontroller 322 sends the facial recognition response messages 43 and the user authorization response messages 83 via the public network interface 222 over the public network 23. The database interface 127 provides information associated with the facial recognition database 58 and the authorized user table 96 to and from the server microcontroller 322.

In the illustrated example, some of the communications associated with the modules 44 are shown. The modules are shown communicating with other modules 44, with the database interface 127, and with the server microcontroller 322 via the operating system 136. A database virtual communications channel 86 is shown between the facial recognition module 54 and the database interface 127. This channel 86 abstracts a communications path that includes the facial recognition module 54, the operating system 136, the server microcontroller 322, and the database interface 127.

The connected services system 50 processes the facial recognition request messages 33 generally as follows. The public network interface 222 receives the facial recognition request messages 33 sent from the local control unit 18, and forwards the request messages 33 to the public network interface 222. The request messages 33 include the facial signatures 90 of the individuals 60 computed at the access point 10. The public network interface 222 forwards the facial recognition request messages 33 to the server microcontroller 322. The server microcontroller 322 provides the request messages 33 to the modules 44 via the operating system 136. The modules 44 at the server 45 then determine whether the computed facial signatures in the request messages 33 correspond to users registered in the facial recognition database 58.

In more detail, the facial recognition module 54 extracts the computed facial signatures from the request messages 33, and executes a lookup 85 of the computed facial signatures against the facial recognition database 58. The facial recognition module 54 sends the lookup messages 85 over the database virtual channel 86 to the facial recognition database 58. The facial recognition database 58 then compares the facial signatures in the lookup messages 85 against the stored facial signatures 90 in each of the entries 89-1 . . . 89-N.

The facial recognition database 58 processes each lookup message 85 as follows. The facial recognition database 58 matches the facial signature in the lookup message 85 against the stored facial signatures 90 in the entries 89, and computes a match confidence score.

The match confidence score is calculated for the following reasons. One reason is that the match is usually not an exact one. This is because although the facial images/patches from which the computed facial signatures 101 and the stored facial signatures 90 might be of the same individual 60, the facial images are different images, captured at different times and under possibly different conditions. Another reason is that there may be multiple stored facial signatures 90 for the same individual 60. As a result, the facial recognition database 58 computes the match confidence score to determine which of the stored facial signatures 90 best match the facial signature in the lookup message 85.

If the confidence score for the "best" matching facial signature 90 is below a certain threshold, or no matching signature 90 is found, the facial recognition database 58 returns a NULL entry 89 in response to the lookup 85. Otherwise, the facial recognition database 58 returns the entry 89 with the closest matching stored facial signature 90.

The facial recognition module 54 then creates the facial recognition response messages 43 from the entries 89 returned in response to the lookup messages 85. Specifically, if a non-NULL entry 89 is returned for each lookup 85, the facial recognition module 54 extracts the user identity information 109 from the entry 89 and includes this information in the associated response message 43. Otherwise, the module 54 includes a NULL reference in the response message 43.

The facial recognition module 54 then sends the response messages 43 over the public network to the local control unit 18.

The connected services system 50 then processes each user authorization request message 73 sent from the local control unit 18 as follows. The facial recognition module 54 extracts user identity information 109 from the request message 73, and includes the user identity information 109 in a lookup message 95. The facial recognition module 54 then sends the lookup message 95 over the virtual database channel 86 to the authorized user table 96. The facial recognition module 54 then determines whether the user identity information 109 (e.g. identifier (ID)) in the lookup message 95 matches a user record 14 in the authorized user table 96. If such a user record 14 is found, the facial recognition database 58 returns the user record 14 in response to the lookup 95; otherwise, the facial recognition database returns a NULL record.

The facial recognition module 54 receives the response from the lookup message 95, and creates an empty user authorization response message 83. If the lookup 95 returned a non-NULL user record 14, the facial recognition module 54 sets a Boolean TRUE value within the response message 83. Otherwise, the facial recognition module 54 sets a Boolean FALSE value. The facial recognition module 54 then sends the response message 83 over the public network 23 to the local control unit 18.

As a result, the access control system includes: one or more surveillance cameras 103 at the access point 10 that capture the image data 70, the facial cropper module 146, the facial signature module 148, and the facial recognition module 54. The facial cropper module 146 extracts facial patches from the image data 70, and the facial signature module 148 computes facial signatures from the facial patches. The facial recognition module 54 receives the computed facial signatures from the facial signature module 148, matches the computed facial signatures to stored facial signatures 90, and sends user identity information 109 of individuals corresponding to the stored facial signatures to the facial signature module 148 when the computed facial signatures match the stored facial signatures.

Figure 6A:
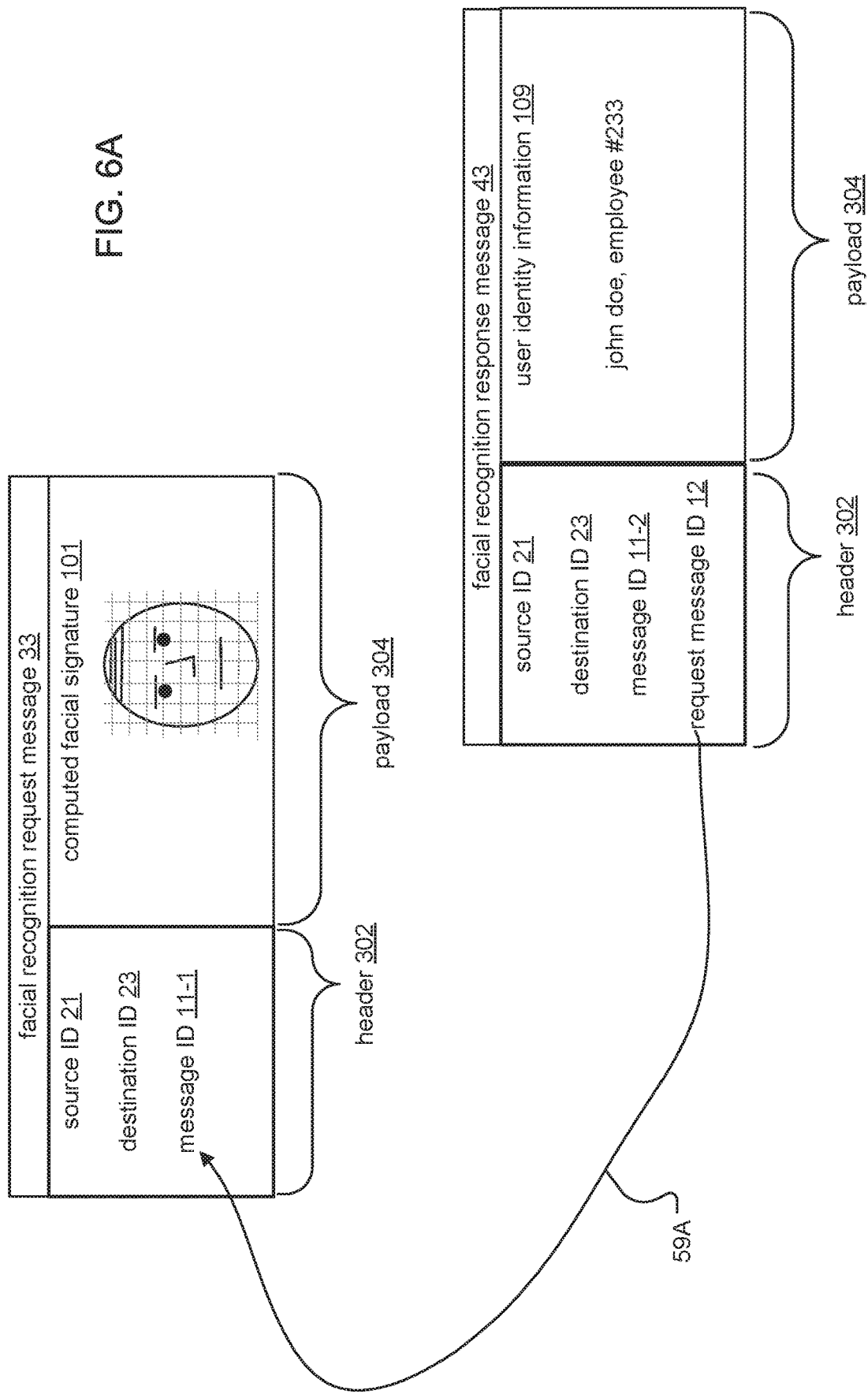
FIG. 6A shows more detail for facial recognition request messages and facial recognition response messages used by the access control system during facial recognition to identify individuals.

FIG. 6A shows more detail for the facial recognition request messages 33 and the facial recognition response messages 43. Each response message 43 is paired with a corresponding request message 33.

The facial recognition request message 33 has a header 302 and a payload 304 portion. The header 302 includes fields such as a message ID 11-1, a source ID 21, and a destination ID 23. In one example, when the access control system uses IP/Ethernet protocols, the IDs 21/23 are media access control (MAC) addresses. The payload 304 portion includes the computed facial signature 101 of an individual 60 computed by the facial signature module 148.

The facial recognition response message 43 also has a header 302 and a payload 304 portion. The header 302 includes a message ID 11-2, a request message ID 12, a source ID 21 and a destination ID 23. The value of the request message ID 12 is the same value of the message ID 11-1 in the corresponding request message 33. This is indicated by arrow with reference 59A. In this way, the request and response messages 33,43 are paired to one another.

In the illustrated example, the payload 304 portion of the response message 43 includes the user identity information 109 of an identified user in the database 58, such as "john doe, employee #233".

The user identity information 109 corresponds to a stored facial signature 90 in the database 58. This stored facial signature 90 closely matched the computed facial signature 101 extracted from the corresponding request message 33.

Figure 6B:
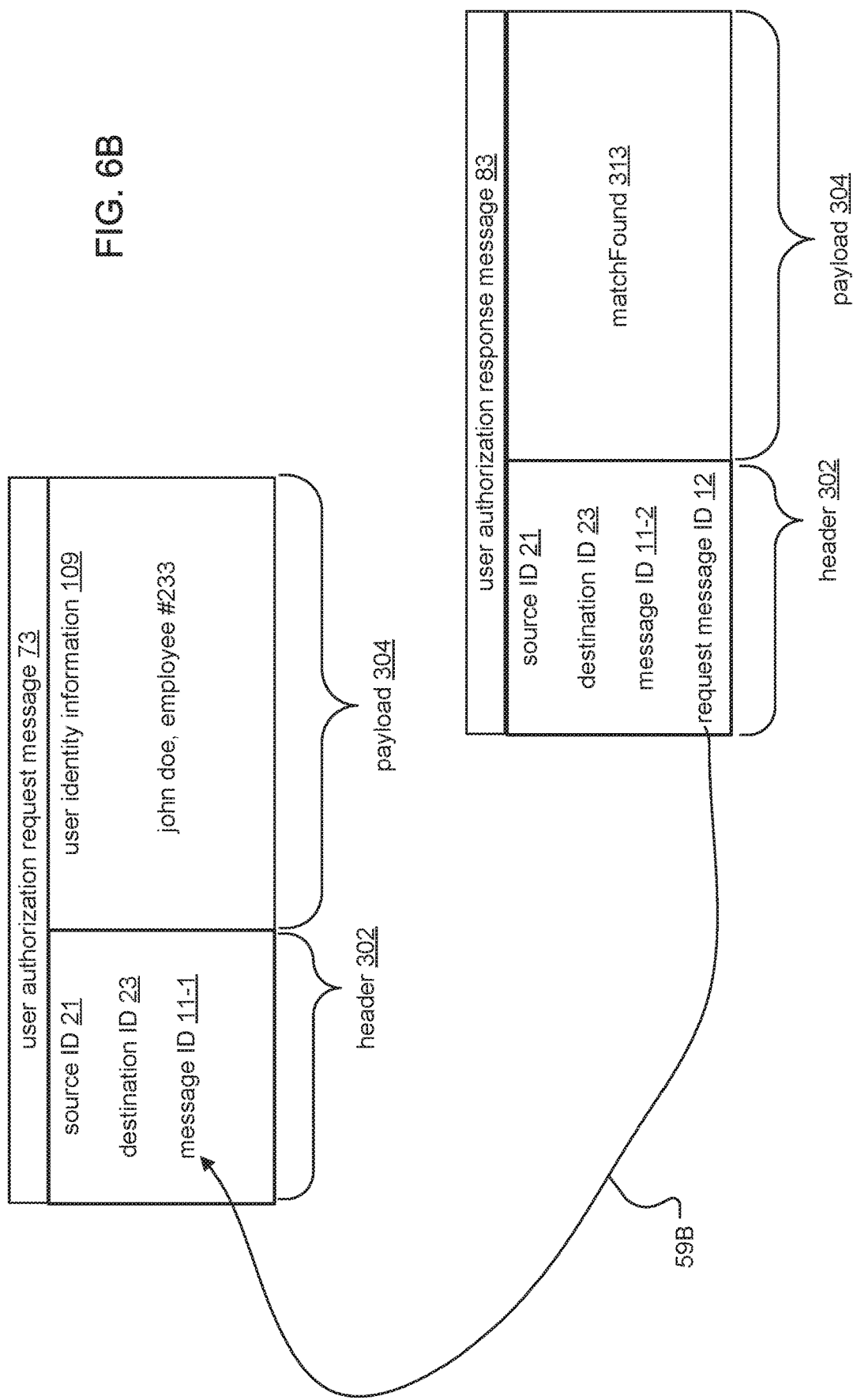
FIG. 6B shows more detail for user authorization request messages and user authorization response messages used by the access control system, where the access control system uses the messages to determine whether the identified individuals are also authorized users.

FIG. 6B shows more detail for the user authorization request messages 73 and the user authorization response messages 83. Each response message 83 is paired with a corresponding request message 73.

The user authorization request message 73 has a header 302 and a payload 304 portion. The header 302 includes fields such as a message ID 11-1, a source ID 21, and a destination ID 23. In the illustrated example, the payload 304 portion includes the same user identity information 109 contents as in the payload 304 of the facial recognition response message 43 in FIG. 6A.

The user authorization response message 83 also has a header 302 and a payload 304 portion. The header 302 includes a message ID 11-2, a request message ID 12, a source ID 21 and a destination ID 23. The value of the request message ID 12 is the same value of the message ID 11-1 in the corresponding request message 73. This is indicated by arrow with reference 59B. In this way, the request and response messages 73,83 are paired to one another.

The payload 304 portion of the response message 83 includes an indication as to whether the user identity information 109 in the request message 73 was determined to be associated with an authorized user. In one implementation, as shown, the indication is a Boolean value. This value is shown in the payload 304 as "matchFound" 313.

FIG. 7 is a block diagram that shows more detail for the authorized user table 96. The table 96 includes user records 14 of authorized individuals/users. Exemplary user records 14-1 through 14-N are shown.

Each user record 14 typically includes at least the following fields: the user identity information 109, an authorization level 110, an employee number 111, and a supervisor name 112.

Figure 8:
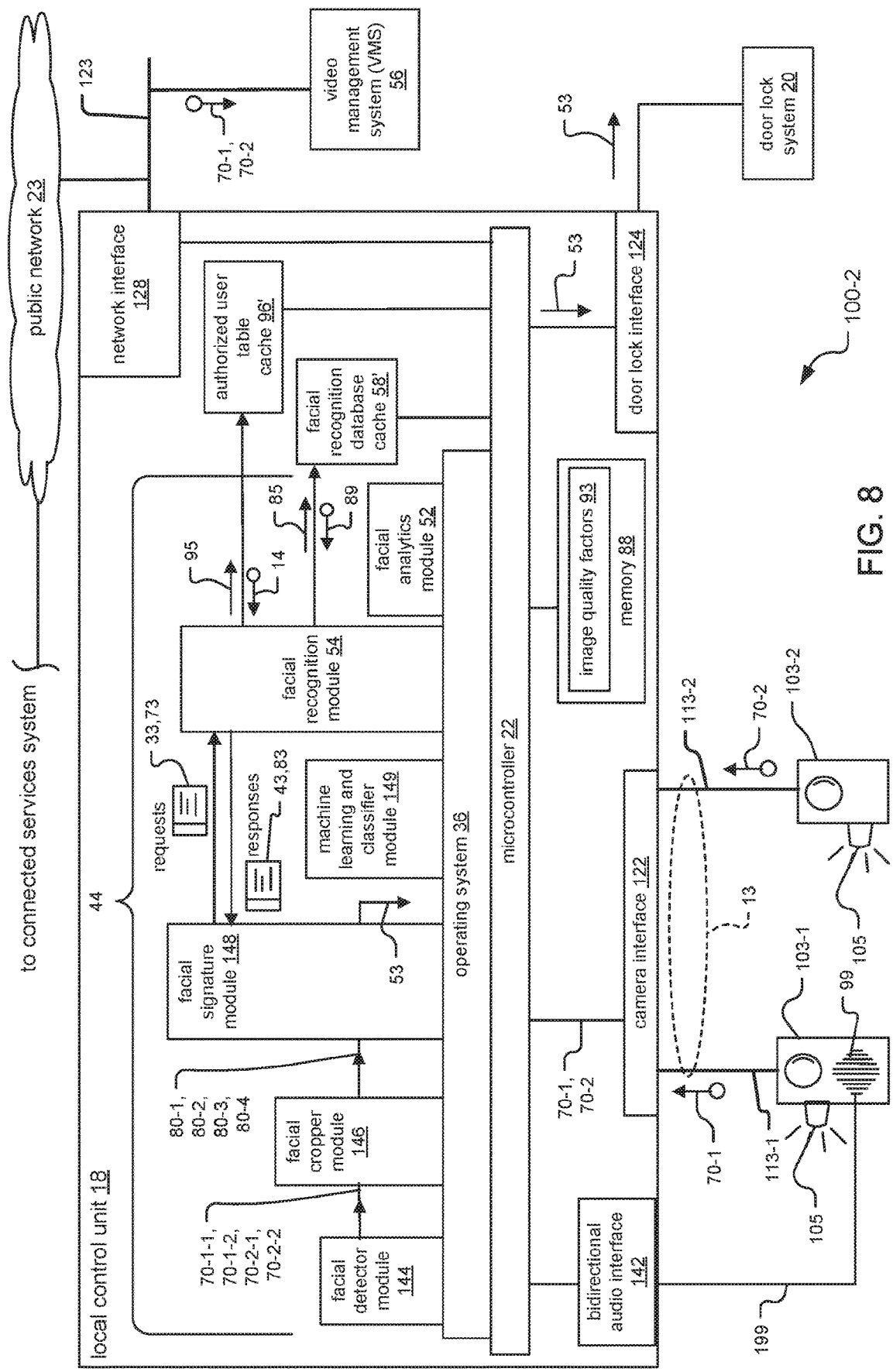
FIG. 8 is a schematic diagram for a second embodiment of the access control system.

FIG. 8 illustrates a second embodiment of the access control system. This second embodiment is indicated using reference 100-2.

This embodiment performs the image analysis and facial recognition operations at the local control unit 18. As in the first embodiment of the access control system 100-1 in FIG. 2, relatively inexpensive cameras can be used. The local control unit 18 includes a copy of the facial recognition database 58, in the form of a facial recognition database cache 58'. The connected services system 50 is generally not used in this embodiment.

The local control unit 18 has similar components as the local control unit 18 in the first embodiment of the access control system 100-1 in FIG. 2, and includes additional components. The local control unit 18 includes the same interfaces, memory 88, modules 44, microcontroller 22, and operating system 36. In addition, the local control unit includes a facial recognition database cache 58', an authorized user table cache 96', and additional modules 44. Specifically, the local control unit 18 additionally includes the modules 44 that are in the connected services system 50 in the first embodiment of the access control system 100-1 in FIG. 5. These modules are the facial recognition module 54 and the facial analytics module 52.

The facial recognition database cache 58' and the authorized user table cache 96' are typically copies of the facial recognition database 58 and the authorized user table 96 at the connected services system 50, respectfully. The facial recognition database 58 and the authorized user table 96 can update their respective caches 58'/96' periodically, or an operator can program the contents of the caches 58'/96' based on security objectives, in examples.

The access control system 100-2 generally operates as follows. The cameras 103 send the image data 70 via the cables 113 to the camera interface 122. The microcontroller 22 obtains the image data 70 from the camera interface 122 and provides the image data for processing by the modules 44. The facial detector module 144, the facial cropper module 146, the facial signature module 148, and the machine learning and classifier module 149 operate in a substantially similar fashion as in the first embodiment of the access control system 100-1 in FIG. 2.

The facial signature module 148 creates and sends each facial recognition request message 33 to the facial recognition module 54, and the facial recognition module 54 creates and sends each facial recognition response message 43 in response. In more detail, the facial recognition module 54 receives each request message 33, extracts the computed facial signature 101 from the request message 33, and sends the lookup message 85 including the computed facial signature 101 to the facial recognition database cache 58'. The cache 58' responds to the lookup 85 by sending the entries 89 having stored facial recognition information 90 that closely matches the computed facial signature 101, or by sending a NULL entry 89 when no entries match. The facial recognition module 54 then extracts the user identity information 109 from the matching entry 89, includes the user identity information 109 in a response message 43, and sends the response message 43 back to the facial signature module 148.

The facial signature module 148 then creates the user authorization request messages 73 if the content of the facial recognition response messages 43 identify individuals (i.e. the payload 304 has non-NULL user identity information 109). The facial signature module 148 extracts the user identity information 109 from the facial recognition response messages 43, and includes this user identity information 109 in the user authorization request messages 73.

The facial signature module 148 then sends the user authorization request messages 73 to the facial recognition module 54.

The facial recognition module 54 then processes each user authorization request message 73 sent from the facial signature module 148, and creates and sends the user authorization response messages 83 in response. The facial recognition module 54 extracts the user identity information 109 from the request message 73, and includes the user identity information 109 in a lookup message 95. The facial recognition module 54 then sends the lookup message 95 to the authorized user table cache 96'. The cache 96' then determines whether the user identity information 109 in the lookup message 95 matches a user record 14 in the cache 96'. If a matching user record 14 is found, the cache 96' returns the user record 14 in response to the lookup 95; otherwise, the cache 96' returns a NULL record.

The facial recognition module 54 receives the response from the lookup message 95, and creates a user authorization response message 83. If the lookup 95 returned a non-NULL user record 14, the facial recognition module 54 sets a Boolean TRUE value within the payload 304 of the response message 83. Otherwise, the facial recognition module 54 sets a Boolean FALSE value. The facial recognition module 54 then sends the response message 83 back to the facial signature module 148, in response to the associated user authentication request message 73.

If the response messages 83 indicate that the individuals 60 are authorized, the facial signature module 148 sends the door unlock signal 53 via the door lock interface 124 to the door lock system 20.

Figure 9:
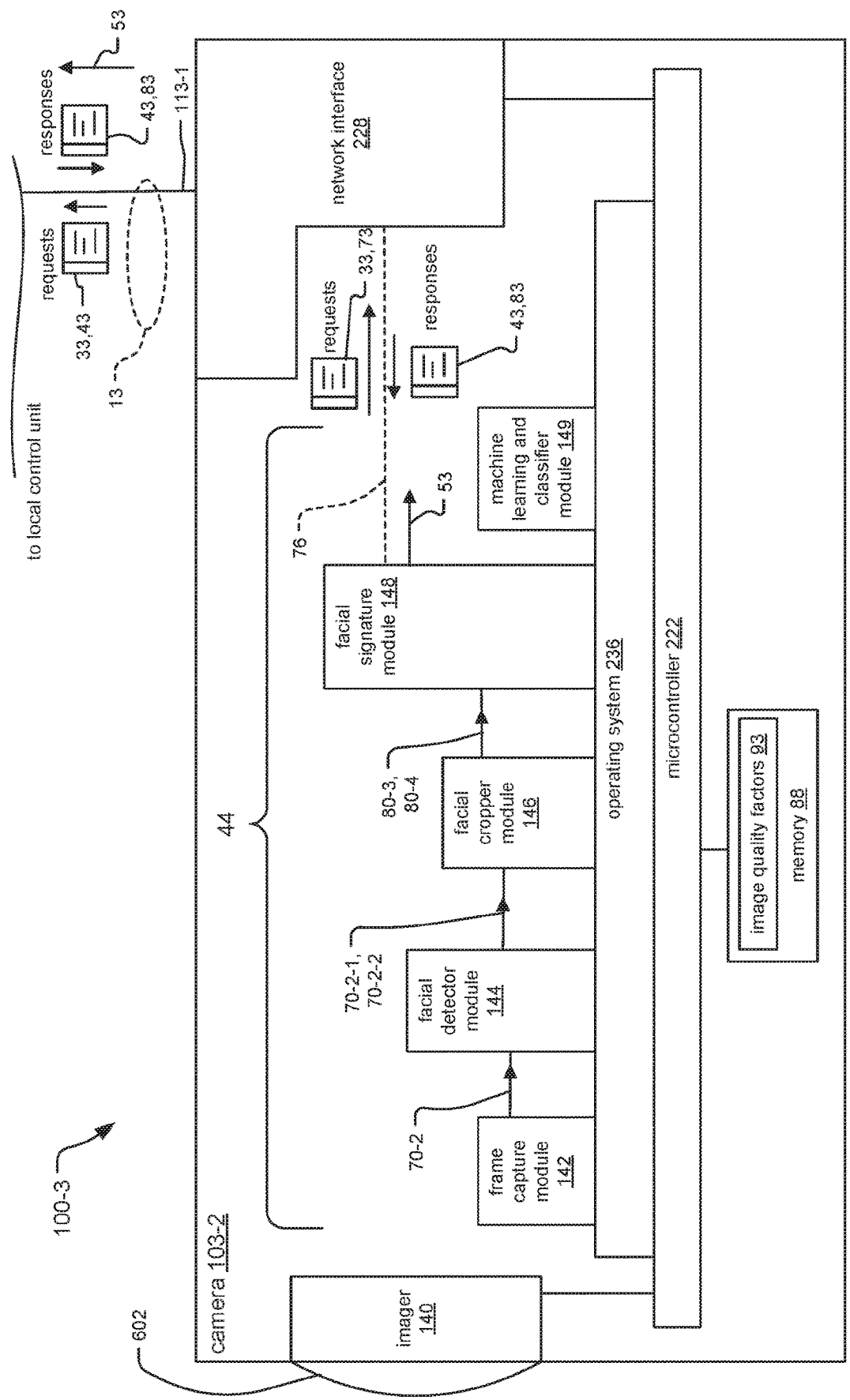
FIG. 9 is a schematic diagram for a third embodiment of the access control system.

FIG. 9 illustrates the third embodiment of the access control system. This third embodiment is indicated using reference 100-3. An exemplary camera 103-2 within the access control system 100-3 is shown.

This embodiment distributes image analysis and facial recognition between the cameras 103 and the local control unit 18. The cameras are "smart" cameras that can analyze the image data 103. The cameras 103-2 analyze the image data 70, and the local control unit 18 performs the facial recognition. As in the second embodiment of the access control system 100-2 in FIG. 8, the local control unit 18 includes the facial recognition database cache 58'. The connected services system 50 is generally not used in this embodiment.

The camera 103-2 has various components. These components include an imager 140, memory 88, a network interface 228, a microcontroller 222, an operating system 236, and modules 44.

The modules 44 include a frame capture module 142, the facial detector module 144, the facial cropper module 146, the facial signature module 148, and the machine learning and classifier module 149. The modules might be software or firmware modules.

The modules 44, the operating system 236, and the microcontroller 222 are shown in a stack-like arrangement. The modules 44 are on top of the operating system 236, and the operating system 236 is on top of the microcontroller 222. This arrangement is due to the fact that the operating system 236 operates as an intermediary between the modules 44 and the microcontroller 222.

The operating system 236 facilitates operation of the modules 44 and schedules their execution on the microcontroller 222. Specifically, the operating system 236 passes information between the microcontroller 222 and the modules 44, loads instructions of the modules 44 into the memory 88, and schedules the modules 44 for execution upon the microcontroller 222.

The microcontroller 222 communicates with the network interface 228 to enable the camera 103-2 to communicate and exchange information with the local control unit 18 and the VMS 56, in examples.

The access control system 100-3 generally operates as follows. At the camera 103-2, the imager 140 creates an image representation, in pixels, of a scene within the field of view 104-2 of the camera 103-2. The imager 140 sends the images via the microcontroller 222 to the frame capture module 142, which places the images in frames of the image data 70-2. The facial detector module 144, the facial cropper module 146, and the facial signature module 148 then analyze the image data 70-2 in a substantially similar fashion as in the local control units 18 of the first and second embodiments of the access control systems 100-1/100-2 shown in FIG. 2 and FIG. 8, respectively.

The facial signature module 148 creates the request messages 33,73 and sends the request messages 33,73 via the network interface 228 to the local control unit 18. The local control unit then 18 creates and sends the response messages 43,83 back to the facial signature module 148.

At the facial signature module 148, if the user authorization response messages 83 indicate that the individuals 60 are authorized, the facial signature module 148 sends the door unlock signal 53 via the door lock interface 124 to the door lock system 20.

Figure 10:
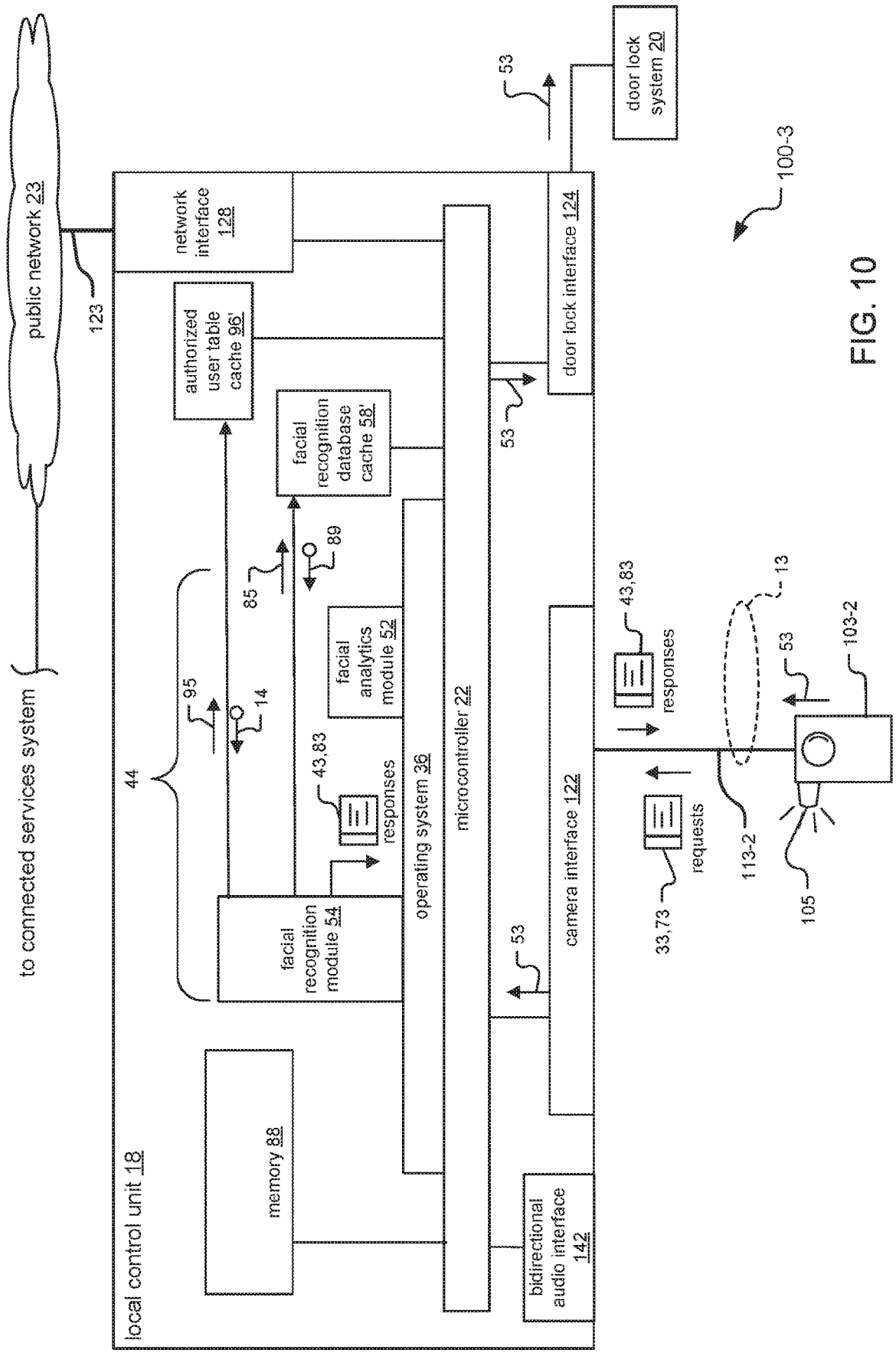
FIG. 10 is a schematic diagram that shows more detail for the local control unit in the third embodiment of the access control system shown in FIG. 9.

FIG. 10 shows more detail for the local control unit 18 in the third embodiment of the access control system 100-3.

The local control unit 18 has substantially the same components as the local control units 18 of the first and second embodiments of the access control systems 100-1/100-2 shown in FIG. 2 and FIG. 8. However, the local control unit 18 has a different arrangement of modules 44. The modules 44 include the facial recognition module 54 and the facial analytics module 52.

The local control unit 18 generally operates as follows. The camera interface 122 receives the request messages 33,73 sent over the cable 113-2 by the camera 103-2. The microcontroller 22 forwards the request messages 33,73 to the modules 44. The modules 44 perform the facial recognition in a substantially similar fashion as the connected services system 50 in the first embodiment of the access control system 100-2 in FIG. 5. The facial recognition module 54 creates the response messages 43,83 and the microcontroller 22 sends the response messages 43,83 via the camera interface 122 and cable 113-2 back to the camera 103-2.

The facial signature module 148 at the camera 103-2 then processes the response messages 43,83 to determine whether the individual is both identified and authorized. If the individual is authorized, the camera 103-2 sends the door unlock signals 53 over the cable 113-2 to the camera interface 122 of the local controller 18.

The microcontroller 22 of the local control unit 18 receives the door lock signal from the camera interface 122, and forwards the door unlock signal 53 via the door lock interface 124 to the door lock system 20. In another implementation, the facial recognition module 54 at the local control unit 18 can send the door unlock signal 53 upon determining that that the individual 60 is an authorized user.

Figure 11:
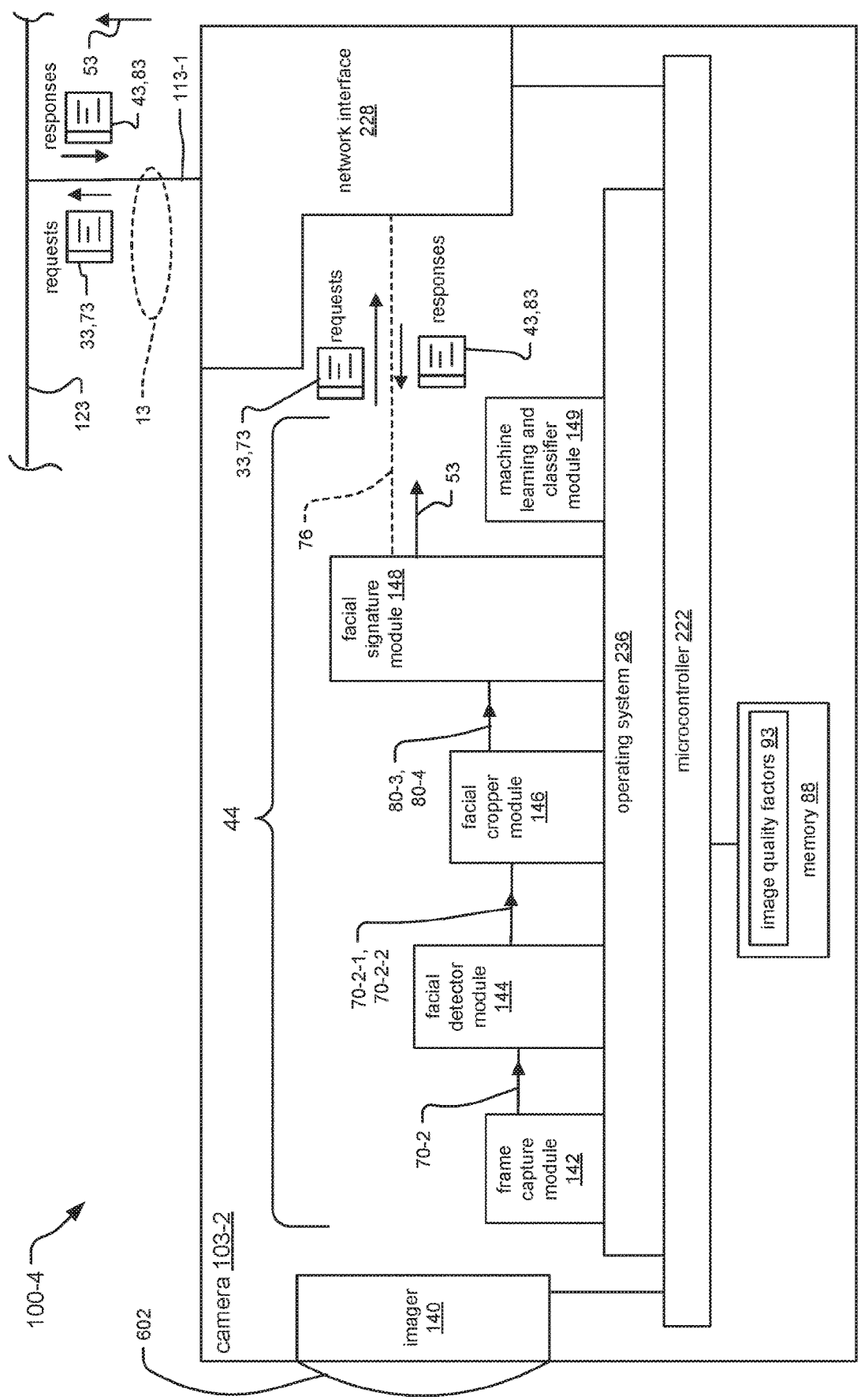
FIG. 11 is a schematic diagram for a fourth embodiment of the access control system.

FIG. 11 illustrates the fourth embodiment of the access control system. This fourth embodiment is indicated using reference 100-4. Exemplary camera 103-2 within the access control system 100-4 is shown.

This embodiment distributes image analysis and facial recognition between the cameras 103 and the connected services system 50. As in the third embodiment of the access control system 100-3 in FIG. 9, the cameras are "smart" cameras that can analyze the image data 70. As in the first embodiment of the access control system 100-1 in FIG. 5, the connected services system 50 performs the facial recognition. There is no local control unit 18 in this embodiment.

The access control system 100-4 generally operates as follows. The camera 103-2 has substantially similar components and operates in a substantially similar manner as the camera 103-2 in the third embodiment of the access control system 100-3 in FIG. 9. The camera 103-2 analyzes the image data 70-2, and creates the request messages 33,73.

The facial recognition module 148 then sends the request messages 33,73 to the connected services system 50, which performs the facial recognition to identify the individuals, and then determines whether the identified individuals are also authorized users The connected services system 50 creates and sends the response messages 43,83 back to the camera 103 in response to the request messages 33,73.

The facial signature module 148 receives the response messages 43,83 over the network interface 228 from the connected services system 50 and processes the response messages 43,83. If the response messages 43,83 indicate that the individuals 60 are identified and authorized, the facial signature module 148 sends the door unlock signal 53 via the door lock interface 124 to the door lock system 20.

Figure 12:
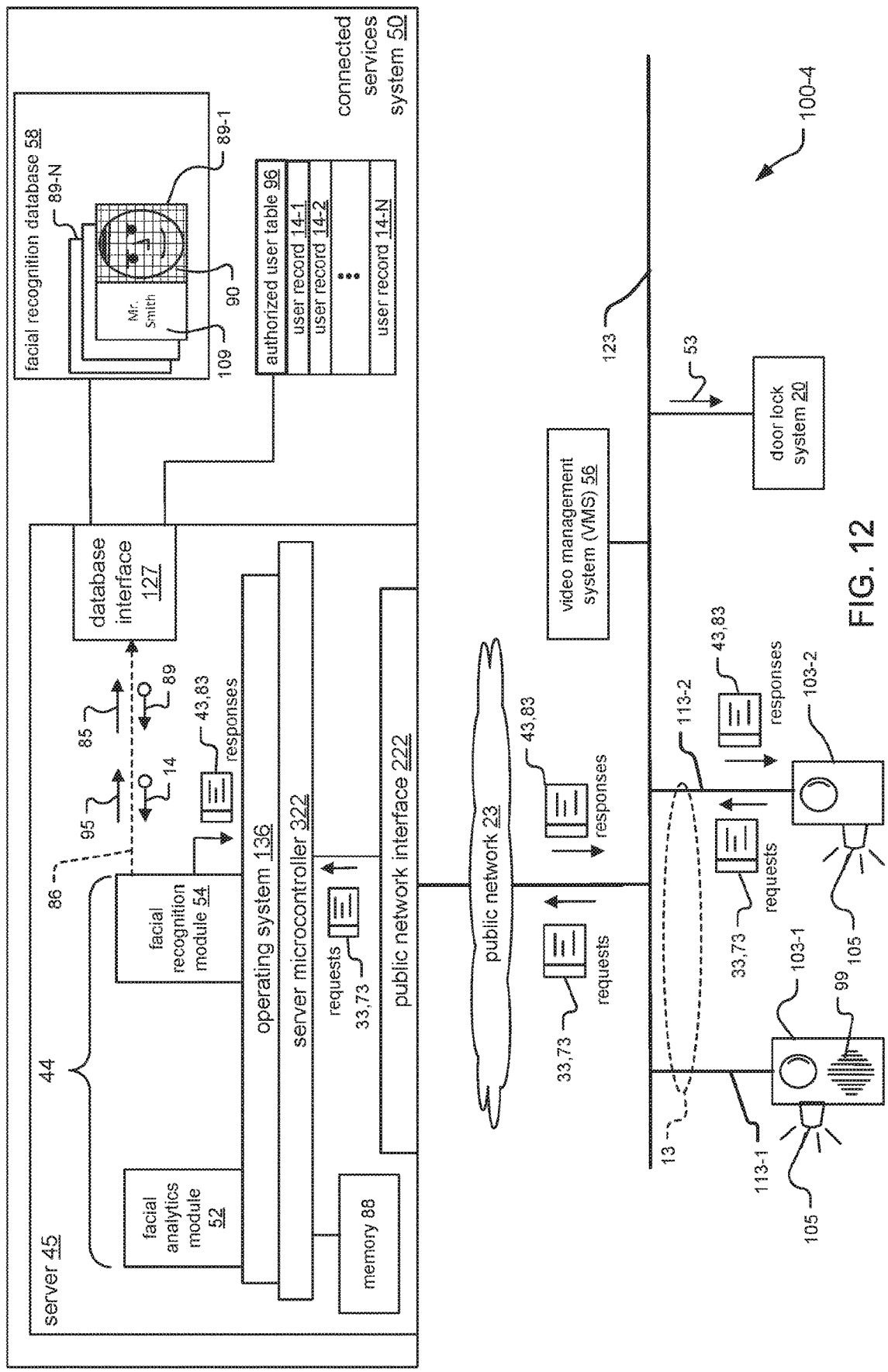
FIG. 12 is a schematic diagram that shows more detail for the connected services system in the fourth embodiment of the access control system shown in FIG. 11.

FIG. 12 shows more detail for the connected services system 50 in the fourth embodiment of the access control system 100-4.

The connected services system 50 has substantially similar components and operates in a substantially similar manner as the connected services system 50 in the first embodiment of the access control system 100-1 in FIG. 5. As there is no local control unit in this embodiment, the server 45 of the connected services system 50 exchanges the request messages 33,73 and the response messages 43,83 with the camera 103-2.

If the facial recognition module 54 at the connected services system 50 determines that the individual 60 is authorized, the facial recognition module 54 might also send the door unlock signal 53. The camera 103-2 would receive the door lock signal 53 over its network interface 228, and the microcontroller 22 would forward the door unlock signal 53 via the door lock interface 124 to the door lock system 20.

Figure 13:
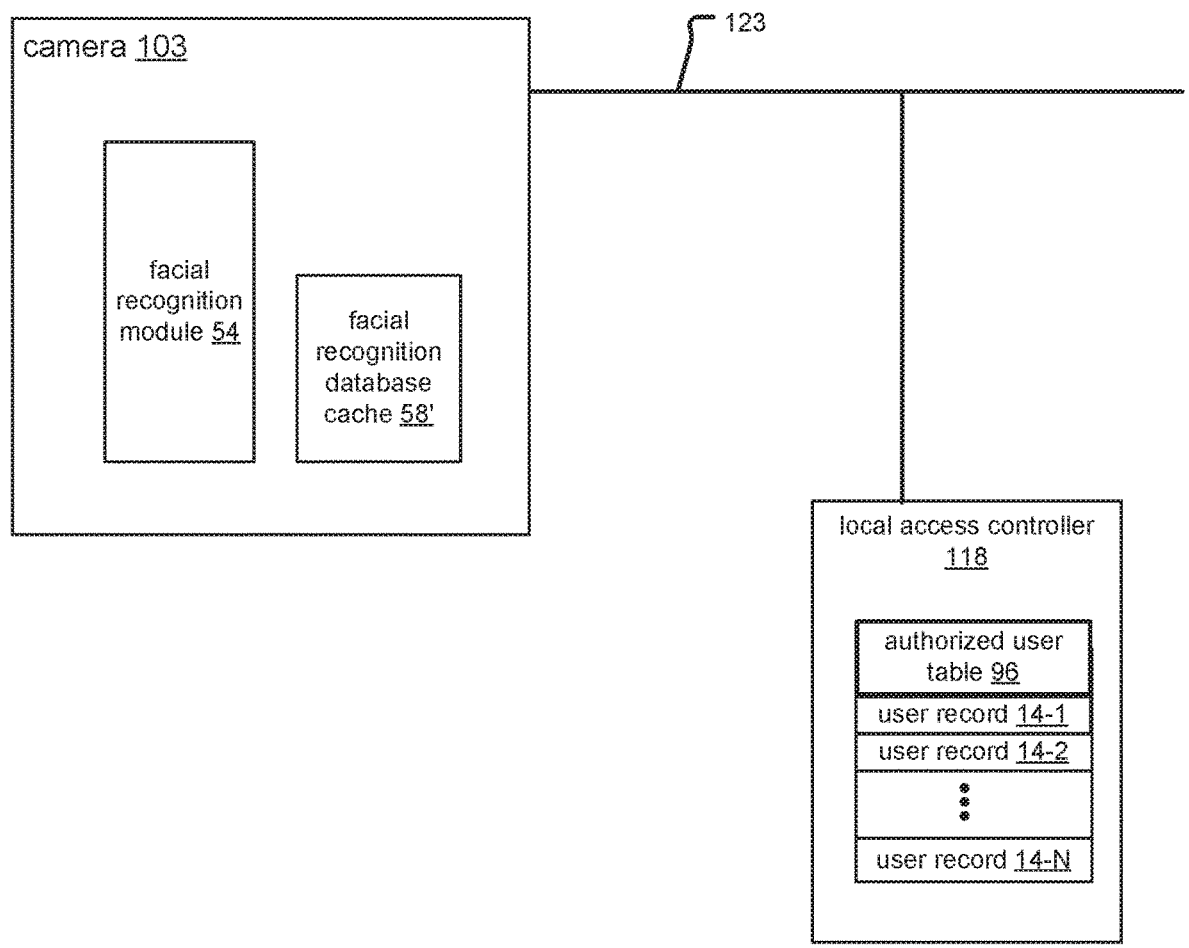
FIG. 13 is a simplified block diagram showing one way the present access control system could be configured, where the diagram shows a camera that includes facial recognition capabilities connected to a local access controller via a local network, where the camera identifies the individuals and the local access controller determines whether the identified individuals are authorized users.

FIG. 13 is a simplified block diagram showing another way that the access control system could be organized.

Here, the camera 103 includes the facial recognition module 54 and the facial recognition database cache 58'. The local access controller 118 includes the authorized user table 96. The camera 103 and the local access controller 118 connect to and communicate over the local network 123.

In operation, the camera 103 executes facial recognition operations to identify users of the access control system. Once the camera 103 has identified the users, the camera 103 sends the information identifying the users over the local network 123 to the local access controller 118. The local access controller 118 then determines whether the identified users are also authorized users.

Figure 14:
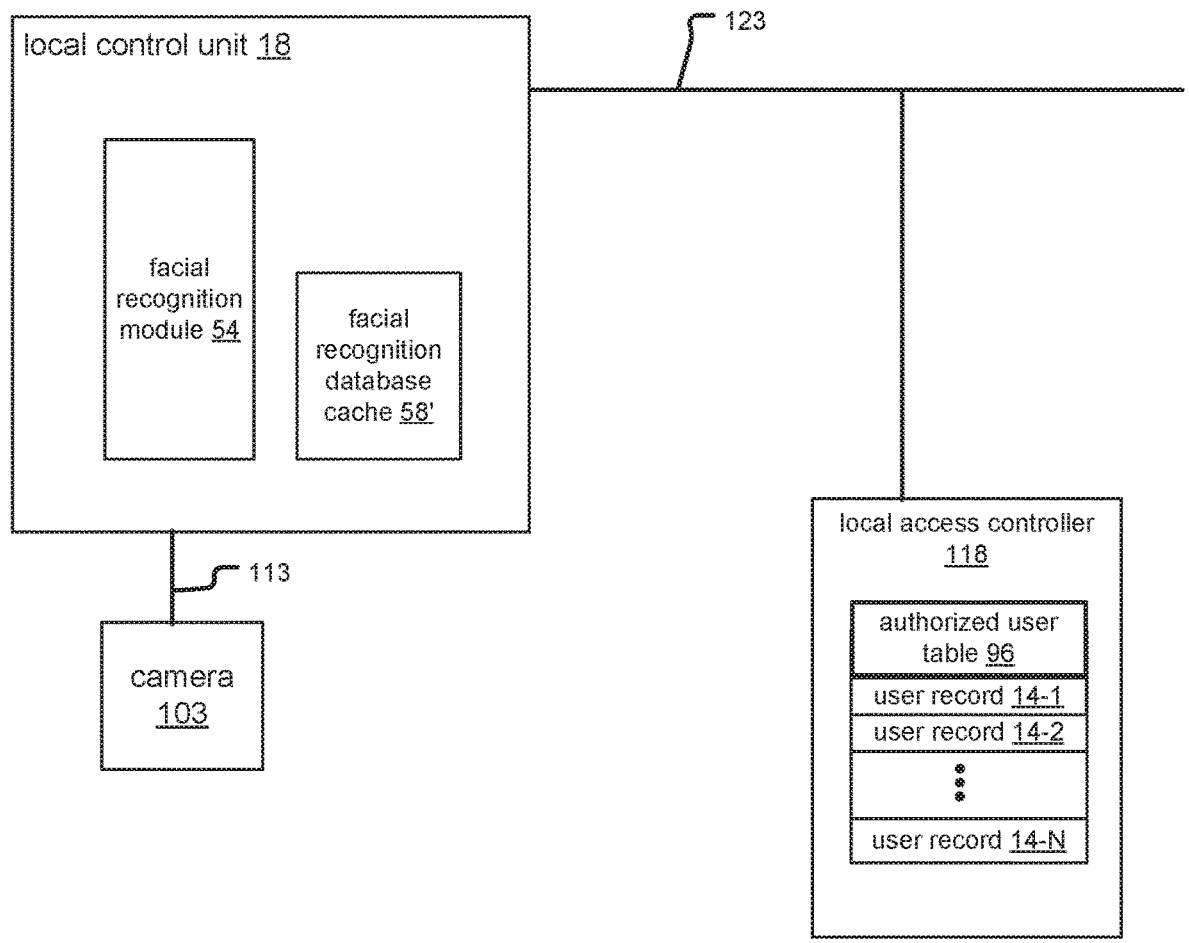
FIG. 14 is a simplified block diagram showing another way the present access control system could be configured, where the diagram shows a local control unit including the facial recognition capabilities and the local access controller connected to the local network.

FIG. 14 is a simplified block diagram showing another way the present access control system could be organized.

Here, the local control unit 18 includes the facial recognition module 54 and the facial recognition database cache 58'. The local access controller 118 includes the authorized user table 96. The local control unit 18 and the local access controller 118 connect to and communicate over the local network 123. The camera 103 connects to the local control unit via cable link 113.

In operation, the local control unit 18 executes facial recognition operations to identify users of the access control system. Once the local control unit 18 has identified the users, the local control unit 18 sends the information identifying the users over the local network 123 to the local access controller 118. The local access controller 118 then determines whether the identified users are also authorized users.

Figure 15:
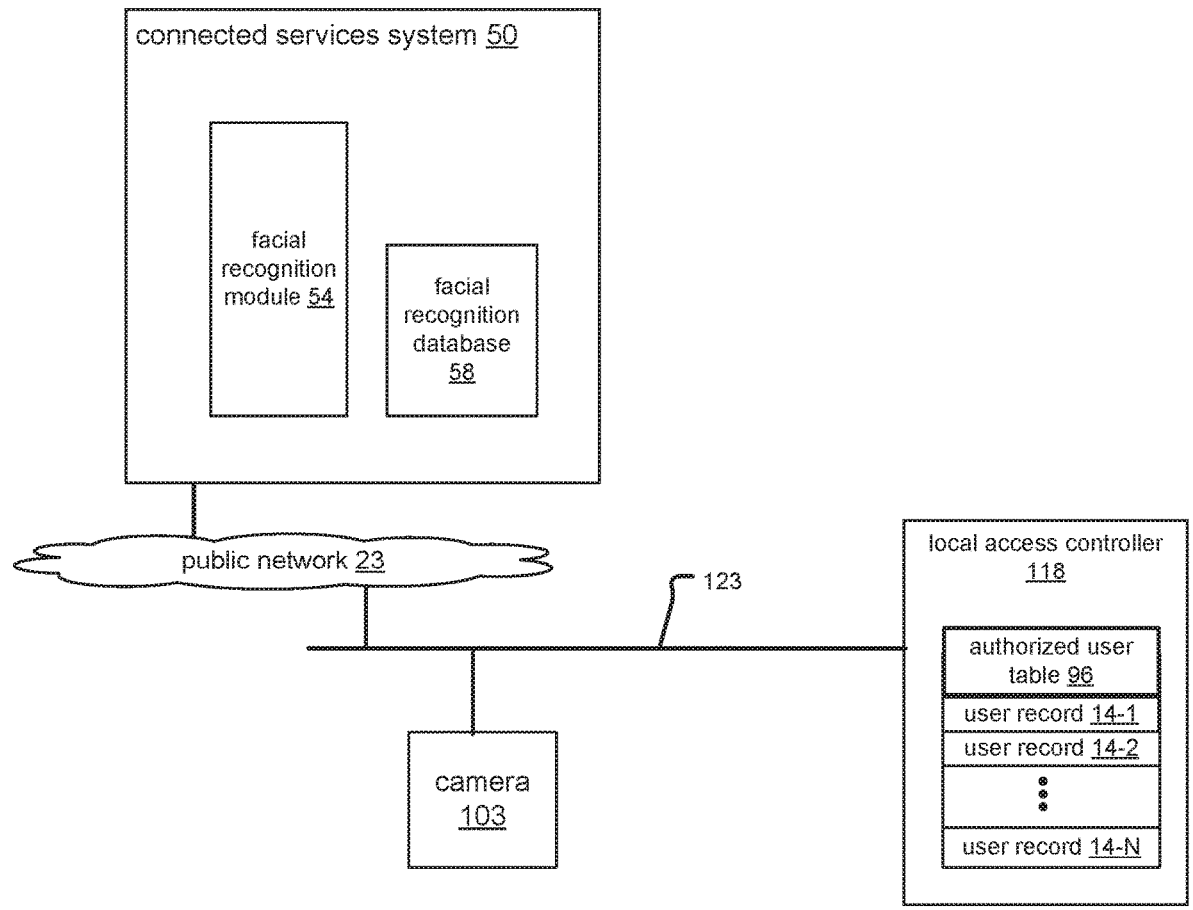
FIG. 15 is a simplified block diagram showing yet another way the present access control system could be configured, where the diagram shows a connected services system including the facial recognition capabilities and the local access controller.

FIG. 15 is a simplified block diagram showing yet another way that the present access control system could be organized. Here, the connected services system 50 includes the facial recognition module 54 and the facial recognition database cache 58'. The local access controller 118 includes the authorized user table 96.

The local access controller 118 and the camera 103 are on the local network 123. The connected services system 50 communicates with the camera 103 and the local access controller 118 via the public network 23.

In operation, the connected services system 50 executes facial recognition operations to identify users of the access control system. Once the connected services system 50 has identified the users, the local control unit 18 sends the information identifying the users over the local network 123 to the local access controller 118. The local access controller 118 then determines whether the identified users are also authorized users.

While this invention has been particularly shown and described with references to preferred embodiments thereof, it will be understood by those skilled in the art that various changes in form and details may be made therein without departing from the scope of the invention encompassed by the appended claims.

What is claimed is:

1. An access control system, comprising:
one or more surveillance cameras at an access point that capture image data;
a first device comprising:
a first memory storing instructions thereon; and
at least one first processor coupled with the first memory and configured by the first instructions to:
extract facial patches from the image data;
rank the facial patches above a predefined threshold by comparing a plurality of machine learning trained image quality factors to a plurality of detected features of a candidate facial patch of the facial patches to determine acceptable facial patches for individuals; and
compute facial signatures from the acceptable facial patches; and
a second device comprising:
a second memory storing second instructions thereon; and
at least one second processor coupled with the second memory and configured by the second instructions to:
receive the facial signatures from the first device;
match the facial signatures to stored facial signatures; and
send user identity information of individuals corresponding to the stored facial signatures to the first device when the facial signatures match the stored facial signatures.

2. The access control system of claim 1, wherein the at least one first processor is further configured by the first instructions to determine a highest ranked acceptable facial patch for each of the individuals, and compute a facial signature for each of the individuals from the highest ranked acceptable facial patch for each of the individuals.

3. The access control system of claim 1, wherein the at least one first processor is further configured by the first instructions to compare each of the facial patches against one another to determine whether the facial patches are associated with same individuals or different individuals.

4. The access control system of claim 1, wherein the one or more surveillance cameras include the first device.

5. The access control system of claim 1, wherein the first device is located at the access point.

6. The access control system of claim 1, wherein the second device is located at the access point.

7. The access control system of claim 6, wherein the second device comprises a cache of the stored facial signatures, and the at least one second processor is further configured by the second instructions to match the facial signatures to respective ones of the cache of the stored facial signatures.

8. The access control system of claim 1, wherein the second device is remote to the access point.

9. The access control system of claim 1, wherein the second device includes a facial recognition database that includes the stored facial signatures and the user identity information of individuals corresponding to the stored facial signatures.

10. The access control system of claim 1, wherein the at least one second processor is further configured by the second instructions to determine whether the individuals are authorized based on the user identity information.

11. The access control system of claim 10, further comprising:
a door lock system at the access point, wherein the at least one first processor is further configured by the first instructions to send a signal to unlock the door lock system when the second device determines that the individuals are authorized users.

12. A method for controlling access to an access control system, comprising:
capturing image data by one or more surveillance cameras at an access point;
extracting facial patches from the image data;
ranking the facial patches above a predefined threshold by comparing a plurality of machine learning trained image quality factors to a plurality of detected features of a candidate facial patch of the facial patches to determine acceptable facial patches for individuals;
computing facial signatures from the acceptable facial patches;
matching the facial signatures to stored facial signatures; and
using user identity information of individuals corresponding to the stored facial signatures when the facial signatures match the stored facial signatures.

13. The method of claim 12, further comprising determining a highest ranked acceptable facial patch for each of the individuals, and computing a facial signature for each of the individuals from the highest ranked acceptable facial patch for each of the individuals.

14. The method of claim 12, further comprising comparing each of the facial patches against one another to determine whether the facial patches are associated with same individuals or different individuals.

15. The method of claim 12, wherein extracting the facial patches from the image data comprises extracting, by the one or more surveillance cameras, the facial patches from the image data, and wherein computing facial signatures from the acceptable facial patches comprises computing, by the one or more surveillance cameras, the facial signatures from the acceptable facial patches.

16. The method of claim 12, wherein extracting the facial patches from the image data comprises extracting, by a device at the access point, the facial patches from the image data, and wherein matching the facial signatures to the stored facial signatures comprises matching by the device at the access point, the facial signatures to the stored facial signatures.

17. The method of claim 12, wherein matching the facial signatures to the stored facial signatures comprises matching, by a device at the access point, the facial signatures to the stored facial signatures.

18. The method of claim 12, wherein matching the facial signatures to the stored facial signatures comprises matching, by a device remote to the access point, the facial signatures to the stored facial signatures.

19. The method of claim 12, wherein a connected services system includes a facial recognition database that includes the stored facial signatures and user identity information of individuals corresponding to the stored facial signatures.

20. The method of claim 19, further comprising:
determining whether the individuals are authorized based on the user identity information;
and transmitting, to a door lock system, a signal to unlock the door lock system when a facial recognition module determines that the individuals are authorized users.

21. A non-transitory computer-readable medium having instructions thereon that, when executed by at least one computing device, causes the at least one computing device to perform operations comprising:
capturing image data by one or more surveillance cameras at an access point;
extracting facial patches from the image data;
ranking the facial patches above a predefined threshold by comparing a plurality of machine learning trained image quality factors to a plurality of detected features of a candidate facial patch of the facial patches to determine acceptable facial patches for individuals;
computing facial signatures from the acceptable facial patches;
matching the facial signatures to stored facial signatures; and
using user identity information of individuals corresponding to the stored facial signatures when the facial signatures match the stored facial signatures.

* * * * *